(12) United States Patent
Zeng et al.

(10) Patent No.: US 10,873,625 B2
(45) Date of Patent: Dec. 22, 2020

(54) SERVICE MANAGEMENT FOR THE INFRASTRUCTURE OF BLOCKCHAIN NETWORKS

(71) Applicant: International Business Machines Corporation, Armonk, NY (US)

(72) Inventors: Sai Zeng, Yorktown Heights, NY (US); Jun Duan, Selden, NY (US); Alexei Karve, Mohegan Lake, NY (US); Neeraj Asthana, Acton, MA (US); Vugranam C. Sreedhar, Yorktown Heights, NY (US); Nerla Jean-Louis, White Plains, NY (US)

(73) Assignee: INTERNATIONAL BUSINESS MACHINES CORPORA ! ION, Armonk, NY (US)

( * ) Notice: Subject to any disclaimer, the term of this patent is extended or adjusted under 35 U.S.C. 154(b) by 19 days.

(21) Appl. No.: 15/905,015

(22) Filed: Feb. 26, 2018

(65) Prior Publication Data

US 2019/0268407 A1    Aug. 29, 2019

(51) Int. Cl.
*H04L 29/08* (2006.01)
*H04L 12/24* (2006.01)
(Continued)

(52) U.S. Cl.
CPC .......... *H04L 67/1091* (2013.01); *G06F 8/656* (2018.02); *G06F 21/57* (2013.01);
(Continued)

(58) Field of Classification Search
CPC . H04L 67/1091; H04L 9/0618; H04L 9/3247; H04L 41/0893; H04L 2209/38;
(Continued)

(56) References Cited

U.S. PATENT DOCUMENTS 8,793,681 B2  7/2014  Ayachitula et al.
9,645,811 B2  5/2017  Carlen et al.
(Continued)

FOREIGN PATENT DOCUMENTS

CN    107423124 A  * 12/2017

OTHER PUBLICATIONS

Kynan Rilee, Understanding Hyperledger Fabric—Byzantine Fault Tolerance, Feb. 14, 2018 (Year: 2018).*
(Continued)

*Primary Examiner* — Tonia L Dollinger
*Assistant Examiner* — Schquita D Goodwin
(74) *Attorney, Agent, or Firm* — Amin, Turocy & Watson, LLP

(57) ABSTRACT

Techniques facilitating service management for the infrastructure of blockchain networks are provided. A system comprises a memory and a processor that executes computer executable components stored in the memory. The computer executable components can comprise an allocation component, a grouping component, and an implementation component. The allocation component can assign, within a blockchain network, a first group of nodes of a first node type to a first set of operation slots and a second group of nodes of a second node type, different than the first node type, to a second set of operation slots. The grouping component can aggregate the second group of nodes assigned to the second set of operation slots with the first group of nodes within the first set of operation slots. The implementation component can execute a service management operation. A consensus algorithm can be satisfied during an execution of the service management operation.

20 Claims, 28 Drawing Sheets

(51) Int. Cl.
*H04L 9/32* (2006.01)
*H04L 9/06* (2006.01)
*G06F 8/656* (2018.01)
*G06F 21/57* (2013.01)

(52) U.S. Cl.
CPC .......... *H04L 9/0618* (2013.01); *H04L 9/3247* (2013.01); *H04L 41/0893* (2013.01)

(58) Field of Classification Search
CPC ..... H04L 9/0637; H04L 47/28; G06Q 20/065; G06F 17/30321; G06F 17/30548; G06F 17/30
USPC ......................................................... 709/226
See application file for complete search history.

(56) References Cited

U.S. PATENT DOCUMENTS

| | | | | |
|---|---|---|---|---|
| 9,723,064 | B1* | 8/2017 | McKelvie | H04L 67/10 |
| 10,554,649 | B1* | 2/2020 | Fields | G06F 16/23 |
| 10,698,675 | B2* | 6/2020 | Bathen | G06F 8/65 |
| 2006/0080656 | A1 | 4/2006 | Cain et al. | |
| 2012/0311157 | A1 | 12/2012 | Erickson et al. | |
| 2014/0317261 | A1 | 10/2014 | Shatzkamer et al. | |
| 2015/0170112 | A1* | 6/2015 | DeCastro | G06Q 20/381 |
| | | | | 705/39 |
| 2016/0371355 | A1* | 12/2016 | Massari | G06F 16/25 |
| 2017/0031676 | A1* | 2/2017 | Cecchetti | G06F 8/65 |
| 2017/0213209 | A1 | 7/2017 | Dillenberger | |
| 2017/0220815 | A1 | 8/2017 | Ansari et al. | |
| 2017/0250972 | A1* | 8/2017 | Ronda | H04L 9/08 |
| 2018/0088928 | A1* | 3/2018 | Smith | H04L 67/34 |
| 2018/0158034 | A1* | 6/2018 | Hunt | G06Q 20/027 |
| 2018/0349418 | A1* | 12/2018 | Lee | G06F 16/219 |
| 2019/0012662 | A1* | 1/2019 | Krellenstein | G06Q 20/3827 |
| 2019/0049931 | A1* | 2/2019 | Tschirschnitz | G05B 19/41865 |
| 2019/0104196 | A1* | 4/2019 | Li | G06F 16/2379 |
| 2019/0182047 | A1* | 6/2019 | Andreina | H04L 9/30 |
| 2019/0251552 | A1* | 8/2019 | Kurian | G06Q 20/065 |

OTHER PUBLICATIONS

Github.com, Procedure for Upgrading from v1.0.x, Jan. 25, 2018, retrieved via URL: https://github.com/hyperledger/fabric/blob/0f38dbc4d432fe07e63643966026ec9cfb44c358/docs/source/upgrade_to_one_point_one.rst (Year: 2018).*

Elli Androulaki, Hyperledger Fabric: A Distributed Operating System for Permissioned Blockchains, Jan. 20, 2018, retrieved via URL: https://arxiv.org/pdf/1801.10228v1.pdf (Year: 2018).*

International Search Report and Written Opinion received for PCT Application Serial No. PCT/EP2019/052371 dated Mar. 25, 2019, 13 pages.

Github, "Procedure for Upgrading from v1.0.x", URL: https://github.com/hyperledger/fabric/blob/0f38dbc4d432fe07e63643966026ec9cfb44c358/docs/source/upgrade_to_one_point_one.rst, Jan. 26, 2018, pp. 1-11.

Androulaki et al., "Hyperledger fabric: A Distributed Operating System for Permissioned Blockchains", URL: https://arxiv.org/pdf/1801.10228v1.pdf, Jan. 30, 2018, pp. 1-15.

Xu et al., "The Blockchain as a Software Connector," 13th Working IEEE/IFIP Conference on Software Architecture (WICSA), 2016, pp. 182-191, IEEE, 10 pages.

Mainelli et al., "Sharing Ledgers for Sharing Economies: An Exploration of Mutual Distributed Ledgers (aka Blockchain Technology)," The Journal of Financial Perspectives: FinTech, 2015, vol. 3, No. 3, EY Global Financial Services Institute, 47 pages.

Linn et al., "Blockchain for Health Data and Its Potential Use in Health IT and Health Care Related Research," ONC/NIST Use of Blockchain for Healthcare and Research Workshop, Sep. 2016, 10 pages.

Bahga et al., "Blockchain Platform for Industrial Internet of Things," Journal of Software Engineering and Applications 2016, pp. 533-546, vol. 9, Scientific Research Publishing, 14 pages.

"Bringing up a Kafka-based Ordering Service," 2017, Hyperledger, 5 pages. Retrieved on Feb. 8, 2018. http://hyperledger-fabric.readthedocs.io/en/latest/kafka.html.

Mell et al., "The NIST Definition of Cloud Computing," National Institute of Standards and Technology, Sep. 2011, 7 pages, Special Publication 800-145, U.S Department of Commerce.

* cited by examiner

```
Number of Kafka Nodes 12
Number of Channels 10
Replication factor 5
Min Insync Replicas 3
Ch \ Kafka Nodes
        0   1   2   3   4   5   6   7   8   9   10  11
C0      *   *   *   *   *
C1                          *   *   *   *   *
C2              *   *   *                       *   *
C3                          *   *   *   *   *
C4      *   *   *   *   *
C5                          *   *   *   *   *
C6              *   *   *                       *   *
C7                          *   *   *   *   *
C8      *   *   *   *   *
C9                          *   *   *   *   *
Slots (K0 K5 K10 K1 K6 K11), (K2 K7 K3 K8), (K4 K9)
```

Example One.

FIG. 26A

```
Number of Kafka Nodes 12
Number of Channels 10
Replication factor 3
Min Insync Replicas 2
Ch \ Kafka Nodes
        0    1    2    3    4    5    6    7    8    9    10   11
C0      *    *    *
C1                     *    *    *
C2                                         *    *    *
C3                                                        *    *    *
C4      *    *    *
C5                     *    *    *
C6                                         *    *    *
C7                                                        *    *    *
C8      *    *    *
C9                     *    *    *
Slots (K0 K3 K6 K9), (K1 K4 K7 K10), (K2 K5 K8 K11)
```

Example Two.

FIG. 26B

Number of Kafka Nodes 17
Number of Channels 10
Replication factor 5
Min Insync Replicas 4

| Ch \ Kafka Nodes | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| C0 | * | * | * | * | * |   |   |   |   |   |    |    |    |    |    |    |    |
| C1 |   |   |   |   |   | * | * | * | * | * |    |    |    |    |    |    |    |
| C2 |   |   |   |   |   |   |   |   |   |   | *  | *  | *  | *  | *  |    |    |
| C3 |   | * | * | * |   |   |   |   |   |   |    |    |    |    |    | *  | *  |
| C4 |   |   |   |   |   | * | * | * | * | * |    |    |    |    |    |    |    |
| C5 |   |   |   |   |   |   |   |   |   |   | *  | *  | *  | *  | *  |    |    |
| C6 | * | * | * | * | * |   |   |   |   |   |    |    |    |    |    |    |    |
| C7 |   |   |   |   |   | * | * | * | * | * |    |    |    |    |    |    |    |
| C8 |   |   |   |   |   |   |   |   |   |   | *  | *  | *  | *  | *  |    |    |
| C9 |   | * | * | * |   |   |   |   |   |   |    |    |    |    |    | *  | *  |

Slots (K0 K5 K10 K15), (K1 K6 K11 K16), (K2 K7 K12), (K3 K8 K13), (K4 K9 K14)

Example Three.

FIG. 26C

SERVICE MANAGEMENT FOR THE INFRASTRUCTURE OF BLOCKCHAIN NETWORKS

BACKGROUND

The subject disclosure relates to distributed computing systems and, more specifically, to service management for interdependent blockchain network functions. In a blockchain network, various types of nodes can be hosted as containers of servers. Sets of the various types of nodes can provide different functionalities and, therefore, management of the nodes should be performed with consideration of the different functionalities of the nodes.

For example, Carlen et al. (U.S. Pat. No. 9,645,811) discusses "a method that detects a failure of a container in a controller node where the container includes a service being performed and isolated from other services being performed in other containers on the controller node." See Abstract. "The controller node terminates the container including the service and determines a known state for the service." See id. "The controller node restarts the service in a new container that replaces the terminated container where the restarted service starts from the known state without using the changes." See id.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses, and/or computer program products that facilitate service management for the infrastructure of blockchain networks are provided.

According to an embodiment, a system can comprise a memory that stores computer executable components and a processor that executes the computer executable components stored in the memory. The computer executable components can comprise an allocation component that assigns, within a blockchain network, a first group of nodes of a first node type to a first set of operation slots and a second group of nodes of a second node type, different than the first node type, to a second set of operation slots. The computer executable components can also comprise a grouping component that aggregates the second group of nodes assigned to the second set of operation slots with the first group of nodes within the first set of operation slots. One or more of the first set of operation slots can comprise a plurality of assigned nodes corresponding to both the first group of nodes and the second group of nodes. Further, the computer executable components can comprise an implementation component that can execute a service management operation based on the grouping component that aggregates the first group of nodes and the second group of nodes within the first set of operation slots. A consensus algorithm can be satisfied during an execution of the service management operation.

In an example, the allocation component can assign the first group of nodes independent of an assignment of the second group of nodes. According to another example, the first node type can be a first functionality present in the blockchain network. Further, to this example, the second node type can be a second functionality present in the blockchain network. The first functionality can be different from the second functionality.

In another example, the implementation component can execute the service management operation based on an endorsement policy associated with the first group of nodes and the consensus algorithm associated with the second group of nodes within the blockchain network. Further to this example, the endorsement policy can determine a minimum number of the second group of nodes required for endorsing a transaction by applying a digital signature to the transaction. The individual transactions can be canceled if the service management operation removes nodes from service for transactions in progress, even while maintaining the minimum number of nodes. In this situation, the client can reissue the transactions. Thus, it can be ensured that validated transactions go onto the blockchain.

According to an example, the consensus algorithm can provide, via maintaining a minimum number of the first group of nodes and the second group of nodes that are in-service, both a correct ordering and a validation for a set of transactions within respective blocks of a blockchain. According to other examples, the consensus algorithm can provide, via maintaining a minimum number nodes within each plurality of node groups that are in-service, both a correct ordering and a validation for a set of transactions within respective blocks of a blockchain. In accordance with another example, the grouping component can minimize a number of steps performed to update the first group of nodes and the second group of nodes during the implementation component executing the service management operation.

Another embodiment relates to a computer-implemented method that can comprise assigning, by a system operatively coupled to a processor and within a blockchain network, a first group of nodes of a first node type to a first set of operation slots and a second group of nodes of a second node type, different than the first node type, to a second set of operation slots. The method can also comprise aggregating, by the system, the second group of nodes assigned to the second set of operation slots with the first group of nodes within the first set of operation slots. One or more of the first set of operation slots can comprise a plurality of assigned nodes corresponding to both the first group of nodes and the second group of nodes. Further, the method can comprise executing, by the system, a service management operation based on the aggregating the first group of nodes and the second group of nodes being aggregated within the first set of operation slots. A consensus algorithm can be satisfied during the execution of the service management operation.

According to an example, the second group of nodes can be endorsing entities. Further to this example, the method can comprise receiving, by the system, a transaction submitted to the blockchain network and determining, by the system, two or more nodes of the second group of nodes endorsed the transaction. The method can also comprise completing, by the system, the transaction during the execution of the service management operation.

Yet another embodiment relates to a computer program product for facilitating service management for a blockchain infrastructure. The computer program product can comprise a computer readable storage medium having program instructions embodied therewith. The program instructions can be executable by a processing component to cause the processing component to assign, by the processing component and within a blockchain network, a first group of nodes of a first node type to a first set of operation slots and a second group of nodes of a second node type, different than the first node type, to a second set of operation slots. The program instructions can also cause the processing component to aggregate, by the processing component, the second group of nodes assigned to the second set of operation slots with the first group of nodes within the first set of operation slots. One or more of the first set of operation slots can comprise a plurality of assigned nodes corresponding to both the first group of nodes and the second group of nodes. The program instructions can also cause the processing component to execute, by the processing component, a service management operation based on an aggregation of the first group of nodes and the second group of nodes being aggregated within the first set of operation slots. A consensus algorithm can be satisfied during the execution of the service management operation.

Another embodiment can relate to a blockchain network that can comprise a first set of nodes that execute a first functionality in the blockchain network and a second set of nodes that execute a second functionality in the blockchain network. The first functionality can be different from the second functionality. The blockchain network can also comprise a service management engine comprising a memory that stores computer executable components and a processor that executes the computer executable components stored in the memory. The computer executable components can also comprise a categorization component that determines the first set of nodes execute the first functionality and the second set of nodes execute the second functionality. The computer executable components can also comprise a rule component that determines a first quantity of steps to be executed to perform service management operation for the first set of nodes and a second quantity of steps to be executed to perform the service management operation for the second set of nodes. Further, the computer executable components can comprise an implementation component that executes the service management operation based on an aggregation of the first quantity of steps and the second quantity of steps. The aggregation can define a minimum number of steps for execution of the service management operation.

In an example, the rule component can determine a quantity of nodes in the first set of nodes is less than a defined quantity of nodes specified for the service management operation. Further to this example, the computer executable components can further comprise an insertion component that adds one or more nodes to the first set of nodes. The insertion component can determine a quantity of nodes to add based on a difference between the quantity of nodes in the first set of nodes and the defined quantity of nodes.

According to another example, the rule component can determine a quantity of nodes in the first set of nodes is more than a defined quantity of nodes specified for the service management operation. In addition, the implementation component can execute the service management operation on the first set of nodes without loss of availability of the blockchain network.

Still another embodiment relates to computer-implemented method that can comprise determining, by a system operatively coupled to a processor, a first set of nodes in a blockchain network execute a first functionality and that a second set of nodes in the blockchain network execute a second functionality different from the first functionality. The method can also comprise determining, by the system, a first quantity of steps to be executed to perform service management operation for the first set of nodes and a second quantity of steps to be executed to perform the service management operation for the second set of nodes. Further, the method can comprise executing, by the system, the service management operation based on an aggregation of the first quantity of steps and the second quantity of steps. The aggregation can define a minimum number of steps for execution of the service management operation.

DESCRIPTION OF THE DRAWINGS

FIG. 11A illustrates an example, non-limiting, representation of uncontrolled usage of nodes.

FIG. 11B illustrates an example, non-limiting, representation of controlled usage of nodes in accordance with one or more embodiments described herein.

FIG. 26A illustrates a first example channel allocation in accordance with one or more embodiments described herein.

FIG. 26B illustrates a second example channel allocation in accordance with one or more embodiments described herein.

FIG. 26C illustrates a third example channel allocation in accordance with one or more embodiments described herein.

DETAILED DESCRIPTION

Figure 1:
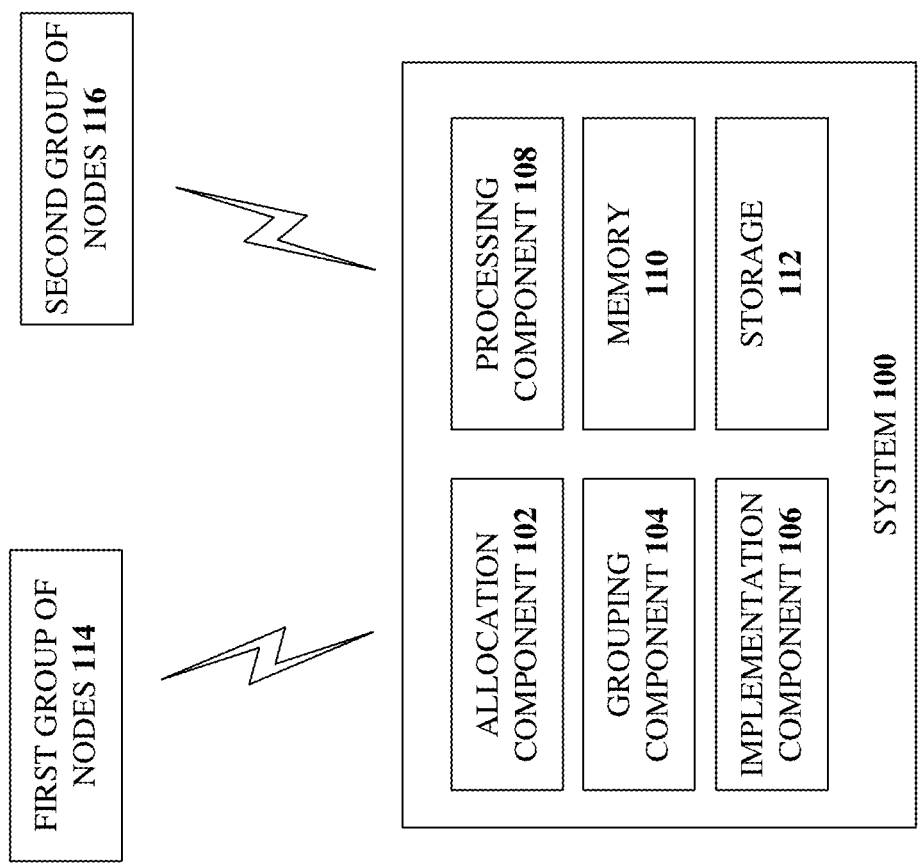
FIG. 1 illustrates a block diagram of an example, non-limiting, system that facilitates service management for the infrastructure of blockchain networks in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

The various aspects discussed herein relate to management and, specifically, service management activities on a network of nodes, such as a blockchain network. As utilized herein a "node" is a particular functionality that is present in the network. Further, the various aspects relate to a blockchain network, and in blockchain terminology, a network refers to a network of nodes. Nodes (or sets of nodes) within the network can have different functionalities. Further, there can be multiple nodes that work together in the form of a cluster.

One or more embodiments discussed herein can relate to enterprise grade service management for blockchain infrastructure across trusted business networks for availability, performance, compliance, and security. For example, unique features of respective types of nodes on a blockchain network can be captured, in the context of service management. Further, the possibility to perform maintenance operations on the infrastructure without interrupting transactions between business participants on the blockchain network can be identified.

Further, the problem of inefficient service management operations caused by uncontrolled designation of broker sets can be discovered with the various embodiments provided herein. In an example, if there is a large blockchain network and data should be shared with only certain participants, a private channel can be created with just those participants. The problem can be solved by explicitly allocating a set of brokers to one or more channels to increase an efficiency of the service management operations.

In addition, provided herein is an overall design for an interruption-free and efficient maintenance procedure. Accordingly, the one or more embodiments can be utilized by all types of businesses from various industries which operate according to an uninterrupted flow of transactions on the blockchain network.

An implementation of a blockchain framework implementation can be a hyperledger fabric. For purposes of explaining the various aspects, examples can be provided related to a hyperledger fabric implementation. However, it is noted that the disclosed aspects are not limited to a hyperledger fabric implementation and other types of blockchain framework implementation can be utilized with the disclosed aspects. Further, although various names of nodes are utilized here to explain the various aspects, implementation of the disclosed aspects are not limited to this naming convention.

As discussed herein, for a blockchain protocol, to update and/or repair a node(s), one or more nodes can be taken down (e.g., for updates, repairs, and so on). In some implementations, to update and/or repair a node(s), there can be a redundancy based on other nodes when a target node is taken down and, therefore, efficiency is not lost. For every node type, there can be some f faulty nodes for which there is tolerance, where f is an integer. It is noted that the formula can be different depending on the type of node under consideration. In an example, related to a first type of node (e.g., an ordering node), there can be a formula that indicates the number of nodes should be no less than 2 f+1 for crash consensus with up to f fault nodes. Thus, for this formula, there has to be a minimum of three ordering nodes in the system. Further, if there are five ordering nodes in the system, failures of two nodes can be tolerated. For Byzantine consensus where malicious nodes could be present, this formula changes to 3 f+1. However, it is noted that other formulas can be utilized with other implementations.

FIG. 1 illustrates a block diagram of an example, non-limiting, system 100 that facilitates service management for the infrastructure of blockchain networks in accordance with one or more embodiments described herein. Aspects of systems (e.g., the system 100 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

The system 100 and/or components of the system 100 can be employed to solve new problems that arise through advancements in technologies mentioned above, computer architecture, and/or the like. One or more embodiments of the system 100 can provide technical improvements to computing systems, processor systems, artificial intelligence systems and/or other systems. One or more embodiments of the system 100 can also provide technical improvements by improving processing performance, improving processing efficiency, and/or improving processing characteristics.

In the embodiment shown in FIG. 1, the system 100 can comprise an allocation component 102, a grouping component 104, an implementation component 106, a processing component 108, a memory 110, and/or a storage 112. The memory 110 can store computer executable components and instructions. The processing component 108 (e.g., a processor) can facilitate execution of the instructions (e.g., computer executable components and corresponding instructions) by the allocation component 102, the grouping component 104, the implementation component 106, and/or other system components. As shown, in some embodiments, one or more of the allocation component 102, the grouping component 104, the implementation component 106, the processing component 108, the memory 110, and/or the storage 112 can be electrically, communicatively, and/or operatively coupled to one another to perform one or more functions of the system 100.

The allocation component 102 can assign, within a blockchain network, a first group of nodes 114 of a first node type to a first set of operation slots. Further, the allocation component 102 can assign, within the blockchain network, a second group of nodes 116 of a second node type, different than the first node type, to a second set of operation slots. The allocation component 102 can assign the first group of nodes 114 to the first set of operation slots independent of an assignment of the second group of nodes 116 to the second set of operation slots.

In some implementations, the first node type can be a first functionality present in the blockchain network and the second node type can be a second functionality present in the blockchain network. The first functionality can be different from the second functionality. In a specific, non-limiting example, within the blockchain network, the first group of nodes can be peer nodes and the second group of nodes can be orderer nodes.

On a blockchain network, peer nodes are used by business participants. Peer nodes endorse one other for transactions on the network. The one or more types of transaction can be associated with a specific endorsement policy, which is agreed upon by business participants. Examples of endorsement policies include, but are not limited to: T(2, 'A', 'B', 'C') requests a signature from any two principals out of 'A', 'B' or 'C'; and T(1, 'A', T(2, 'B', 'C')) requests either one signature from principal A or respective signatures from principals B and C. Maintenance of the peer nodes should be performed in an interactive way with the business participants that are creating various types of transactions and proposing the endorsement policies. For example, if some transaction has policy T(3, 'A', 'B', 'C'), then no nodes can be stopped. Further, there should be communication with the business participants before performance of the operations.

On the blockchain network, orderer nodes are the gateways between peer nodes and the infrastructure. Orderer nodes are public facilities. A peer node can connect to any orderer nodes of its choice for ordering services. Orderer nodes cannot be exclusively used by any business participant at any time. Further, orderer nodes can be homogeneous and no orderer nodes are special. Due to these features, during the maintenance of orderer nodes, it should be guaranteed that, for the one or more peer nodes, there are sufficient orderer nodes available in the vicinity of the peer nodes.

The grouping component 104 can aggregate the second group of nodes 116 assigned to the second set of operation slots with the first group of nodes 114 within the first set of operation slots. Further, one or more of the first set of operation slots can comprise a plurality of assigned nodes corresponding to both the first group of nodes 114 and the second group of nodes 116. The implementation component 106 can executes a service management operation based on the grouping component 104 that aggregates the first group of nodes 114 and the second group of nodes 116 within the first set of operation slots. A consensus algorithm can be satisfied during an execution of the service management operation.

According to some implementations, the implementation component 106 can execute the service management operation based on an endorsement policy associated with the first group of nodes 114 and the consensus algorithm associated with the second group of nodes 116 within the blockchain network. Further to these implementations, the endorsement policy can determine a minimum number of the second group of nodes required for endorsing a transaction by applying a digital signature to the transaction.

In an example, the consensus algorithm can provide, via maintaining a minimum number of the first group of nodes and the second group of nodes that are in-service, both a correct ordering and a validation for a set of transactions within one or more blocks of a blockchain. Further, according to some implementations, the grouping component 104 can minimize a number of steps performed to update the first group of nodes and the second group of nodes during the implementation component executing the service management operation.

In various embodiments, the system 100 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 100 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

In various embodiments, the system 100 can employ hardware and/or software to solve problems that are highly technical in nature, that are not abstract and that cannot be performed as a set of mental acts by a human. Further, in certain embodiments, some of the processes performed can be performed by one or more specialized computers (e.g., one or more specialized processing units, a specialized computer with a quantum computing component, etc.) to carry out defined tasks related to service management.

It is to be appreciated that the system 100 (e.g., the allocation component 102, the grouping component 104, the implementation component 106, and/or other system components) performs service management for blockchain networks that cannot be performed by a human (e.g., is greater than the capability of a single human mind). For example, an amount of data processed, a speed of data processed and/or data types of data processed by the system 100 (e.g., the allocation component 102, the grouping component 104, the implementation component 106, and/or other system components) over a certain period of time can be greater, faster, and different than an amount, speed, and data type that can be processed by a single human mind over the same period of time. The system 100 (e.g., the allocation component 102, the grouping component 104, the implementation component 106, and/or other system components) can also be fully operational towards performing one or more other functions (e.g., fully powered on, fully executed, etc.) while also performing the above-referenced service management for blockchain networks. Moreover, operation slots generated and coordinated by the system 100 (e.g., the allocation component 102, the grouping component 104, the implementation component 106, and/or other system components) can include information that is impossible to obtain manually by a user. For example, a type of information, a variety of information, and/or optimization of the system to generate and output the one or more service management operations can be more complex than information that can be obtained manually and processed by a user.

Figure 2:
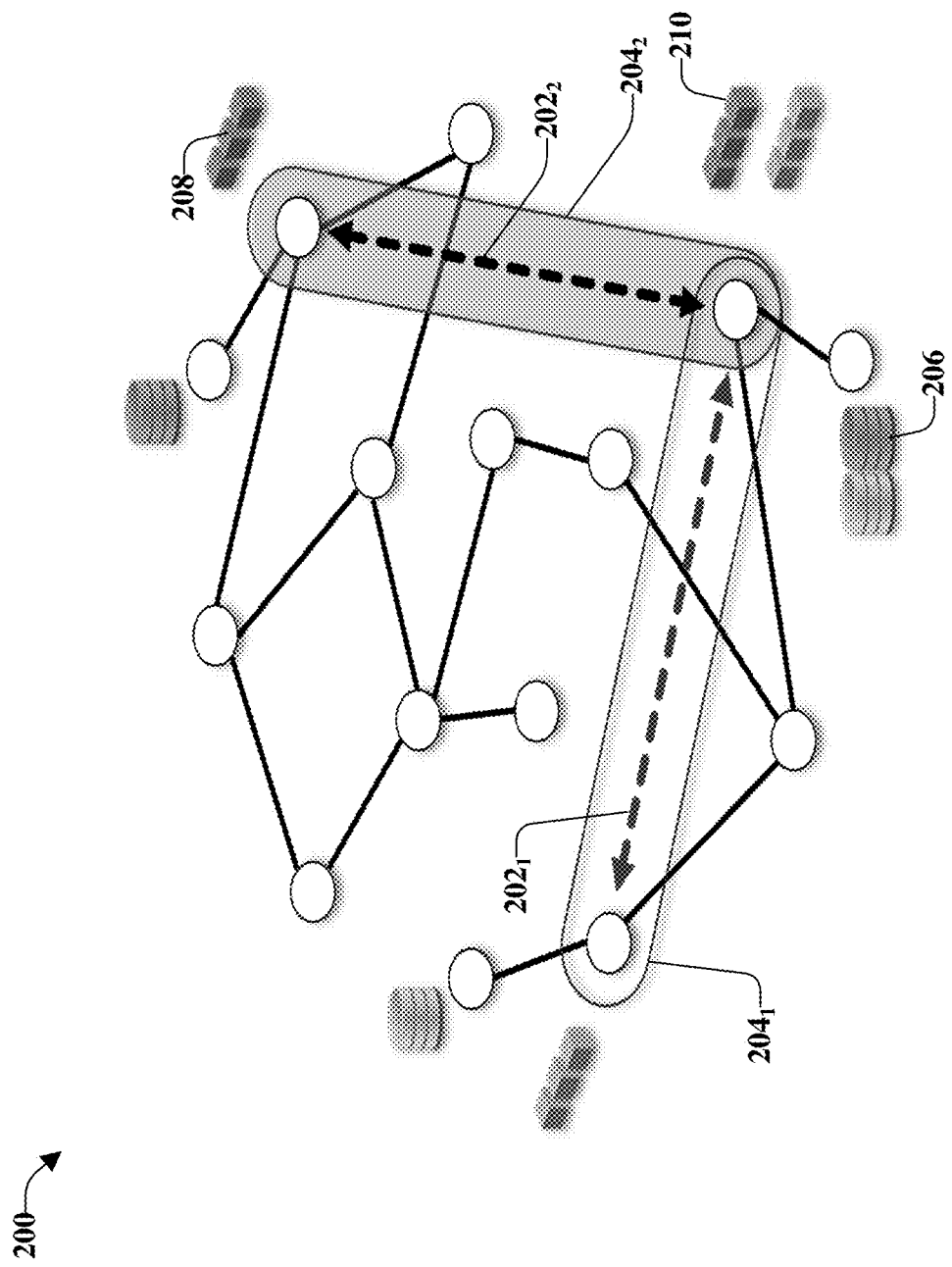
FIG. 2 illustrates an example, non-limiting, representation of a simplified version of a blockchain network in accordance with one or more embodiments described herein.

In further detail, FIG. 2 illustrates an example, non-limiting, representation of a simplified version of a blockchain network 200 in accordance with one or more embodiments described herein. As utilized herein a "transaction" is business logic among the clients of the blockchain networks. In a use case example, the transaction can be a money transfer from a first team member to a second team member, or another type of transfer (e.g., a vehicle transfer).

A "channel" is a private overlay which allows for data isolation and confidentiality. In the use case example, the channel can be a subset of the team members, among which the money transfers are invisible for outsiders. There can be multiple business entities working on a blockchains network. The business entities that work together for the application can belong on one channel. For example, there can be two or more different financial entities working on one channel, however, the entities do not participate in a channel that comprises a different subset of business entities (e.g., car dealerships), which are on a different channel. As mentioned, transactions that take place on a particular channel are not visible to the other entities on that channel, as a function of one or more established rules and/or policies.

A "state" represents the latest (e.g., the most current) values for all keys included in a channel's transaction. In the use case example, the state can be the respective balances of members in the subset of team members. For example, when a transfer is performed, the balance of a first entity (e.g., a first customer) can be reduced and a balance of a second entity (e.g., a second customer) can be increased.

A "ledger" is a verifiable history of all state changes on one or more channels. In the use case example, the ledger can be the history of all balance changes among the subset of team members. A "block" is a list of ordered and encrypted transactions. In the use case example, the block is all transactions in the subset of team members during a defined time range (e.g., a week), ordered by time, and sealed in an envelop (which can be virtual electronic envelop).

Thus, a "blockchain" comprises blocks that can be cryptographically linked to its preceding block. The blockchain can represent an implementation of the ledger. In the use case example, the blockchain can be a pile of envelops, ordered by the defined time range (e.g., the week), and respective envelops can be glued to the previous envelop. In further detail, multiple transactions can go to a block and the block goes into a blockchain in such a way that the block points to the previous block. In an example, there can be a hash operation performed and, if a previous block gets changed by a malicious entity, that node can be removed.

Illustrated in FIG. 2 are two different transactions, illustrated as a first transaction $202_1$ and a second transaction $202_2$. It is noted that although only two transactions are illustrated, there can be more than two transactions occurring at substantially the same time in a blockchain network. The transactions can be submitted on respective applications, such as a banking application, a car sales application, or another type of application.

The one or more applications can be deployed on separate channels (illustrated as the long rounded boxes). For example, the first transaction $202_1$ that utilizes a first application can be deployed on a first channel $204_1$ and the second transaction $202_2$ that utilizes a second application can be deployed on a second channel $204_2$.

In addition, there can be nodes that participate in a consensus, which can be independent nodes. The nodes (represented by the circles) are not included in a channel, as illustrated. In an example, when a customer submits a request to the application, everything that belongs to a channel is part of the transaction. Further, transactions, regardless of the application used, attempt to obtain consensus from an independent set of nodes, which are channel independent. It is noted that consensus occurs outside of the transactions.

In an example use case, an application can indicate that a transfer of a certain amount of money should be from a first account to a second account (e.g., a transaction). Another application can indicate that a vehicle is to go from the dealership to a customer and ownership of the vehicle is being transferred between the two entities. These two different transactions occur on different channels. However, the transactions, when independent consensus is achieved, can be merged into the same block. Thus, there can be multiple transactions going onto the same block and that is what the consensus achieves. Further, the consensus can facilitate an ordering of the transactions. For example, the consensus puts the transactions into a block, adds that into the blockchain, and then adds it into the committing nodes, which can occur outside of the transactions.

In further detail, the first channel $204_1$ is in a defined state 206 that is to be persisted. The defined state 206 can comprise the latest values for all keys included in a channel's transaction. In a use case example, a state comprises the balances of everyone in the subset of team members. When the one or more transactions are completed, there is a blockchain 208 where all the blocks 210 are persisted, which can provide a verifiable history of all the state changes on one or more channels.

Figure 3:
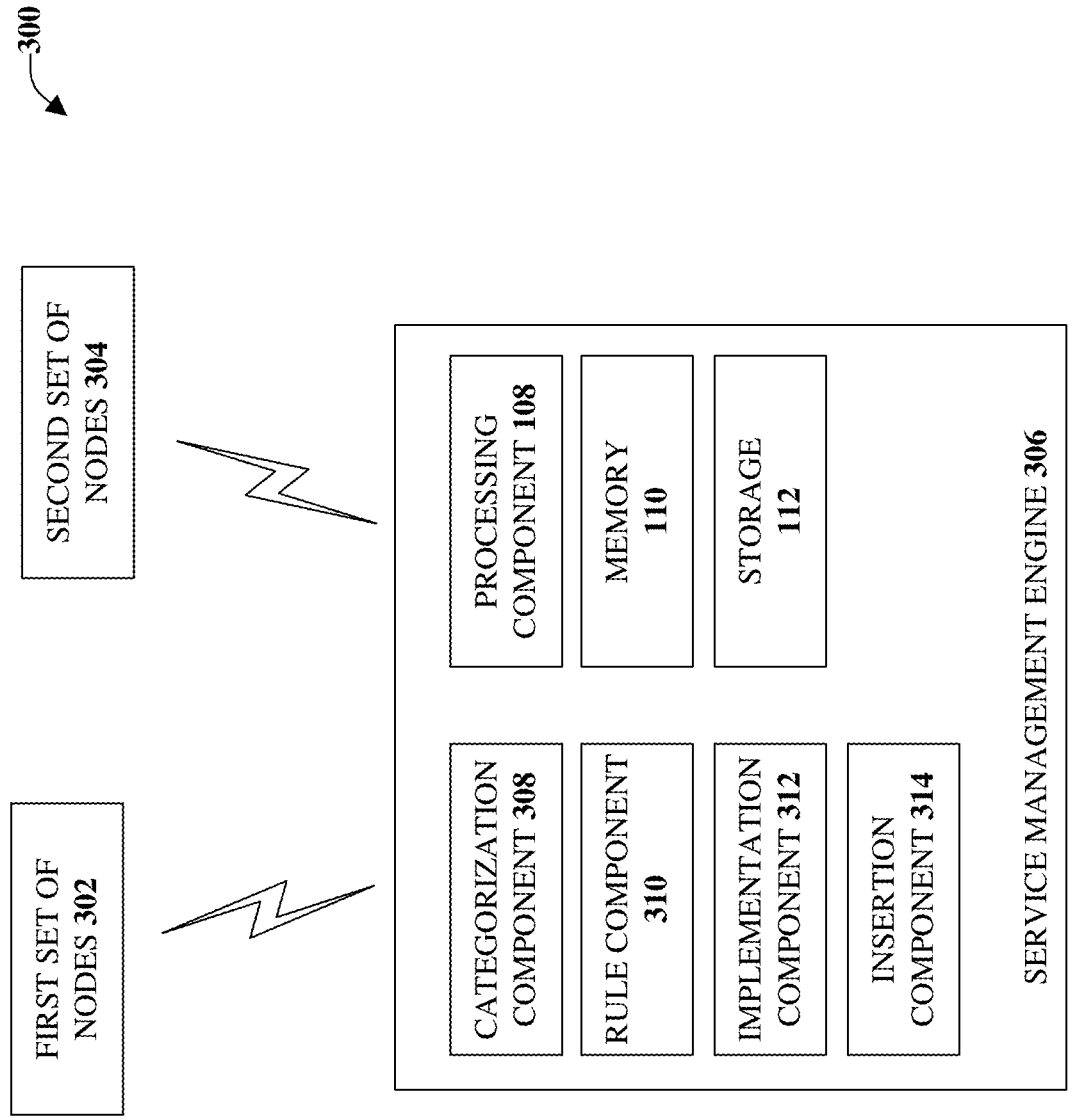
FIG. 3 illustrates a block diagram of an example, non-limiting, blockchain network the facilitates service management in accordance with one or more embodiments described herein.

FIG. 3 illustrates a block diagram of an example, non-limiting, blockchain network 300 the facilitates service management in accordance with one or more embodiments described herein. Repetitive description of like elements employed in other embodiments described herein is omitted for sake of brevity.

The blockchain network 300 can comprise one or more of the components and/or functionality of the system 100, and vice versa. The blockchain network 300 can comprise a first set of nodes 302 that cat execute a first functionality in the blockchain network 300. Also included can be a second set of nodes 304 that can execute a second functionality in the blockchain network 300. The first functionality executed by the first set of nodes 302 can be different than the second functionality executed by the second set of nodes 304.

Also included in the blockchain network 300 can be a service management engine 306, a categorization component 308, a rule component 310, an implementation component 312, and an insertion component 314. Further, the service management engine 306 can comprise a memory (e.g., the memory 110) that can store computer executable components and a processor (e.g., the processing component 108) that can execute the computer executable components stored in the memory.

The categorization component 308 can determine the first set of nodes 302 execute the first functionality and the second set of nodes 304 execute the second functionality. The rule component 310 can determine a first quantity of steps to be executed to perform service management operation for the first set of nodes 302 and a second quantity of steps to be executed to perform the service management operation for the second set of nodes 304. Further, the implementation component 312 can execute the service management operation based on an aggregation of the first quantity of steps and the second quantity of steps. For example, the aggregation can define a minimum number of steps for execution of the service management operation.

According to an implementation, the rule component 310 can determine a quantity of nodes in the first set of nodes 302 is less than a defined quantity of nodes specified for the service management operation. Further to this implementation, the insertion component 314 can add one or more nodes to the first set of nodes 302. For example, the insertion component 314 can determine a quantity of nodes to add based on a difference between the quantity of nodes in the first set of nodes 302 and the defined quantity of nodes.

According to some implementations, the rule component 310 can determine a quantity of nodes in the first set of nodes 302 is more than a defined quantity of nodes specified for the service management operation. Further to these implementations, the implementation component 312 can execute the service management operation on the first set of nodes 302 without failure of the blockchain network 300.

Figure 4:
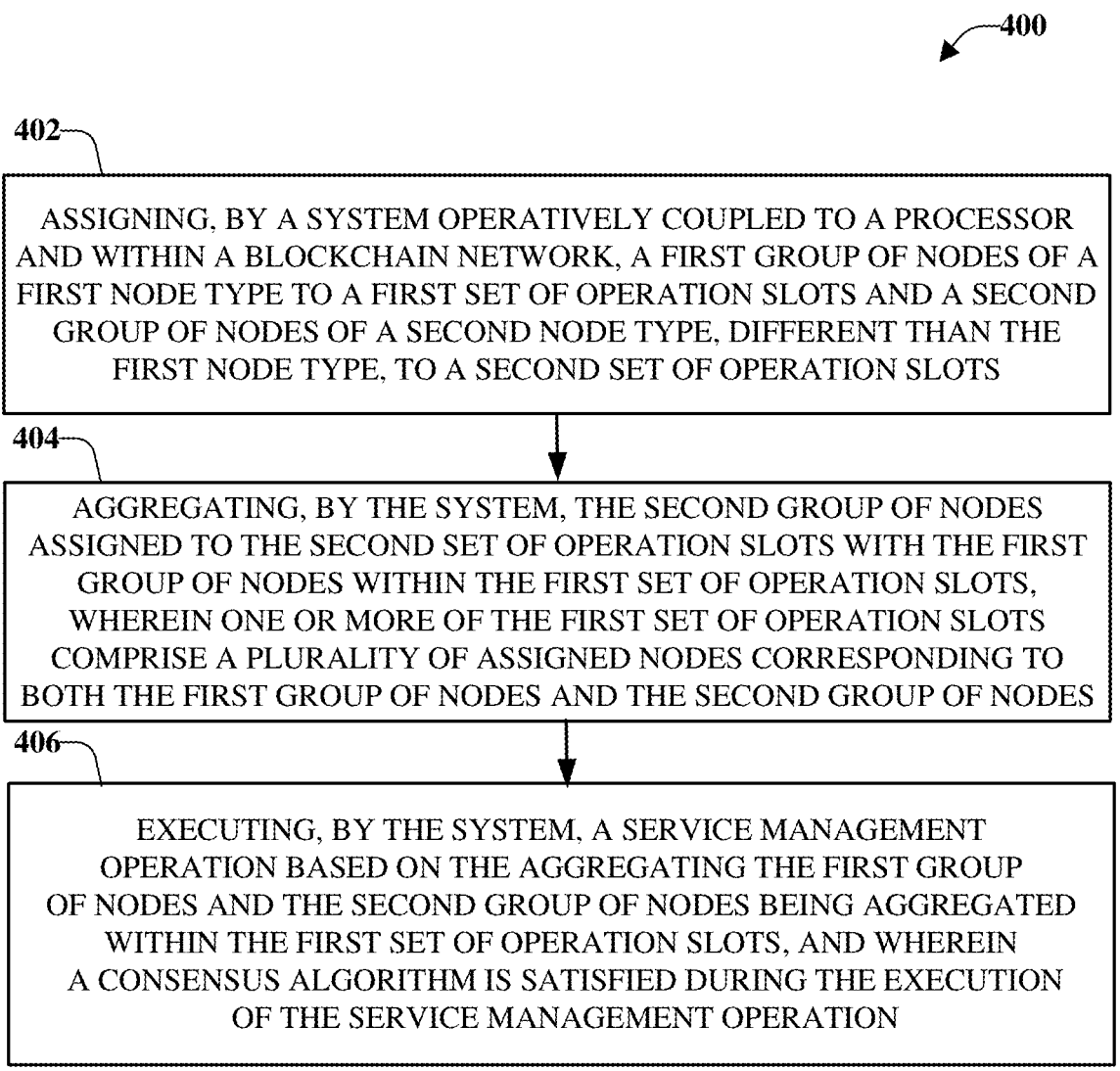
FIG. 4 illustrates a flow diagram of an example, non-limiting, computer-implemented method that facilitates executing a service management in a blockchain network in accordance with one or more embodiments described herein.

FIG. 4 illustrates a flow diagram of an example, non-limiting, computer-implemented method 400 that facilitates executing a service management in a blockchain network in accordance with one or more embodiments described herein. Repetitive description of like elements employed in other embodiments described herein is omitted for sake of brevity.

At 402, a system operatively coupled to a processor and within a blockchain network can assign a first group of nodes (e.g., the first group of nodes 114, the first group of nodes 302) of a first node type to a first set of operation slots and a second group of nodes (e.g., the second group of nodes 116, the second group of nodes 304) of a second node type, different than the first node type, to a second set of operation slots (e.g., via the allocation component 102). According to an implementation, the first group of nodes can be assigned to the first set of operation slots independent of the second group of nodes being assigned to the second set of operation slots.

In an example, the first node type can be a first functionality present in the blockchain network. Further to this example, the second node type can be a second functionality present in the blockchain network. The first functionality and the second functionality can be different functionalities. In a specific example, the first group of nodes can be peer nodes and the second group of nodes can be orderer nodes. It is noted, however, that the one or more embodiments provided herein are not limited to this implementation and other types of nodes can be utilized for the first group of nodes, the second group of nodes, and/or subsequent groups of nodes.

The second group of nodes assigned to the second set of operation slots can be aggregated, by the system, with the first group of nodes within the first set of operation slots, at 404 (e.g., via the grouping component 104). One or more of the first set of operation slots can comprise a plurality of assigned nodes corresponding to both the first group of nodes and the second group of nodes.

Further, at 406, the system can execute a service management operation based on the aggregating the first group of nodes and the second group of nodes being aggregated within the first set of operation slots (e.g., via the implementation component 106). A consensus algorithm can be satisfied during the execution of the service management operation.

For example, the service management operation can be executed based on an endorsement policy associated with the first group of nodes and the consensus algorithm associated with the second group of nodes within the blockchain network. Further to this example, a minimum number of the second group of nodes required for endorsing a transaction can be determined based on applying a digital signature to the transaction.

According to some implementations, to aggregate the second group of nodes, a number of steps performed to update the first group of nodes and the second group of nodes can be determined. The determination of the number of steps performed can be while the service management operation is executed, for example.

In another example, the consensus algorithm can provide, via maintaining a minimum number of the first group of nodes and the second group of nodes that are in-service, both a correct ordering and a validation for a set of transactions within one or more blocks of a blockchain. According to other examples, the consensus algorithm can provide, via maintaining a minimum number nodes within each plurality of node groups that are in-service, both a correct ordering and a validation for a set of transactions within respective blocks of a blockchain.

The service management operation can be executed during processing of a transaction. For example, a transaction can be submitted to the blockchain network prior to, or after, a start of the service management operation. In this case, the service management operation can be temporarily halted if one or more nodes, in the second groups of nodes, are to be utilized to endorse the transaction. Upon or after it is determined that the transaction is complete (e.g., the one or more nodes have completed endorsing (or refused to endorse) the transaction), the service management operation can be executed, as indicated at 406 of the computer-implemented method.

Figure 5:
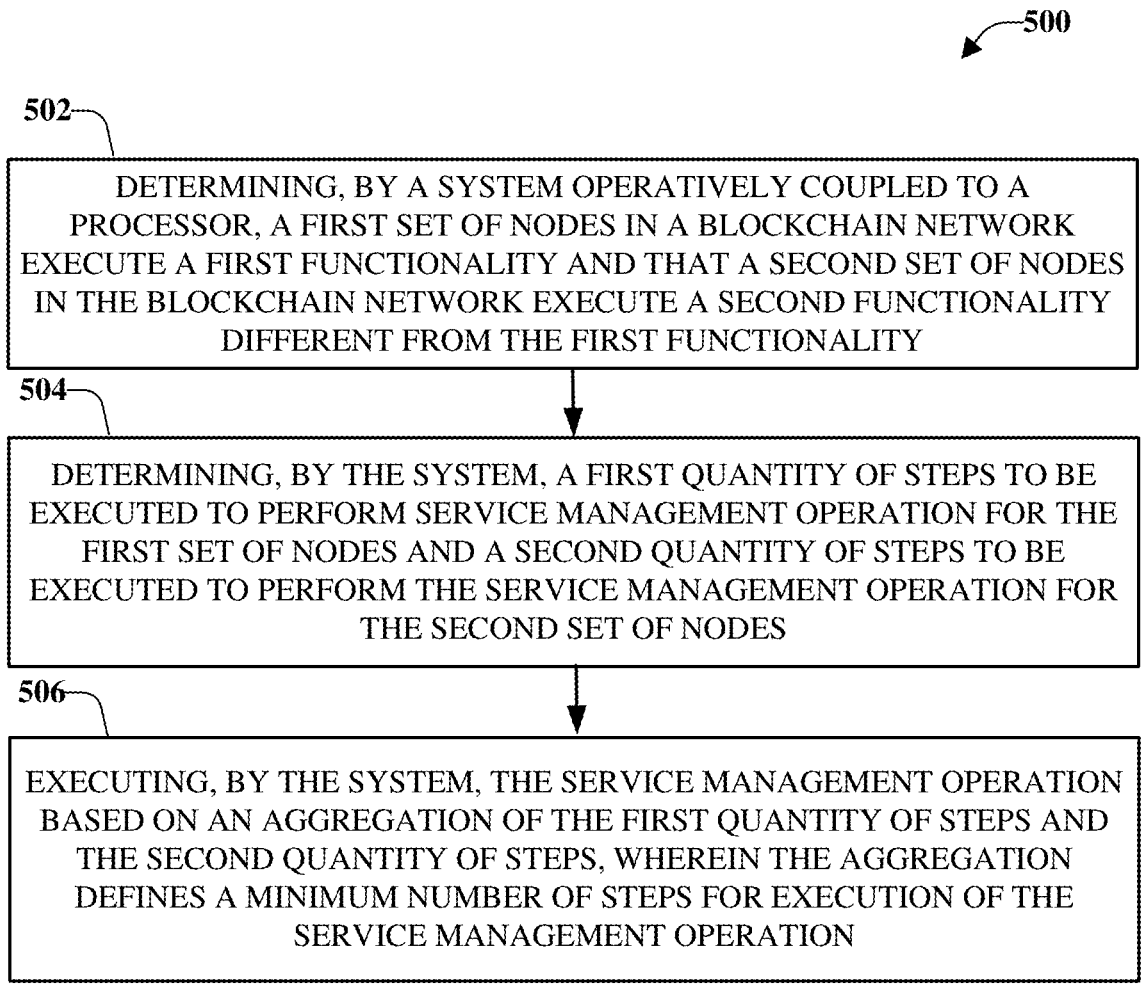
FIG. 5 illustrates a flow diagram of an example, non-limiting, computer-implemented method that facilitates performing service management operations within a blockchain network in accordance with one or more embodiments described herein.

FIG. 5 illustrates a flow diagram of an example, non-limiting, computer-implemented method 500 that facilitates performing service management operations within a blockchain network in accordance with one or more embodiments described herein. Repetitive description of like elements employed in other embodiments described herein is omitted for sake of brevity.

At 502, a system operatively coupled to a processor can determine that a first set of nodes in a blockchain network execute a first functionality and that a second set of nodes in the blockchain network execute a second functionality different from the first functionality (e.g., via the categorization component 308).

A first quantity of steps to be executed to perform service management operation for the first set of nodes and a second quantity of steps to be executed to perform the service management operation for the second set of nodes can be determined by the system, at 504 (e.g., via the rule component 310).

Further, at 506, the system can execute the service management operation based on an aggregation of the first quantity of steps and the second quantity of steps (e.g., via the implementation component 312). The aggregation can define a minimum number of steps for execution of the service management operation.

As discussed herein, the various aspects can manage the servers that hold the different types of nodes in an interruption-free manner, so that the business participants on the network do not notice the service management procedure. Further, the management can be performed in an efficient manner, in terms of the server utilizations and time consumption.

It is noted that on a blockchain network, consensus should be guaranteed on all the channels, but service management activities (e.g., shut down participants' servers/containers/services for the management purpose) could have impact on the consensus. Further, an application is not controlled by any one blockchain service entity. Also, an application is not even fully controlled by the blockchain service provider. Instead, multiple business participants and the service provider should collaborate so that consensus can be delivered. This brings extra complexity to management operations, which can be overcome with the disclosed aspects.

Figure 6:
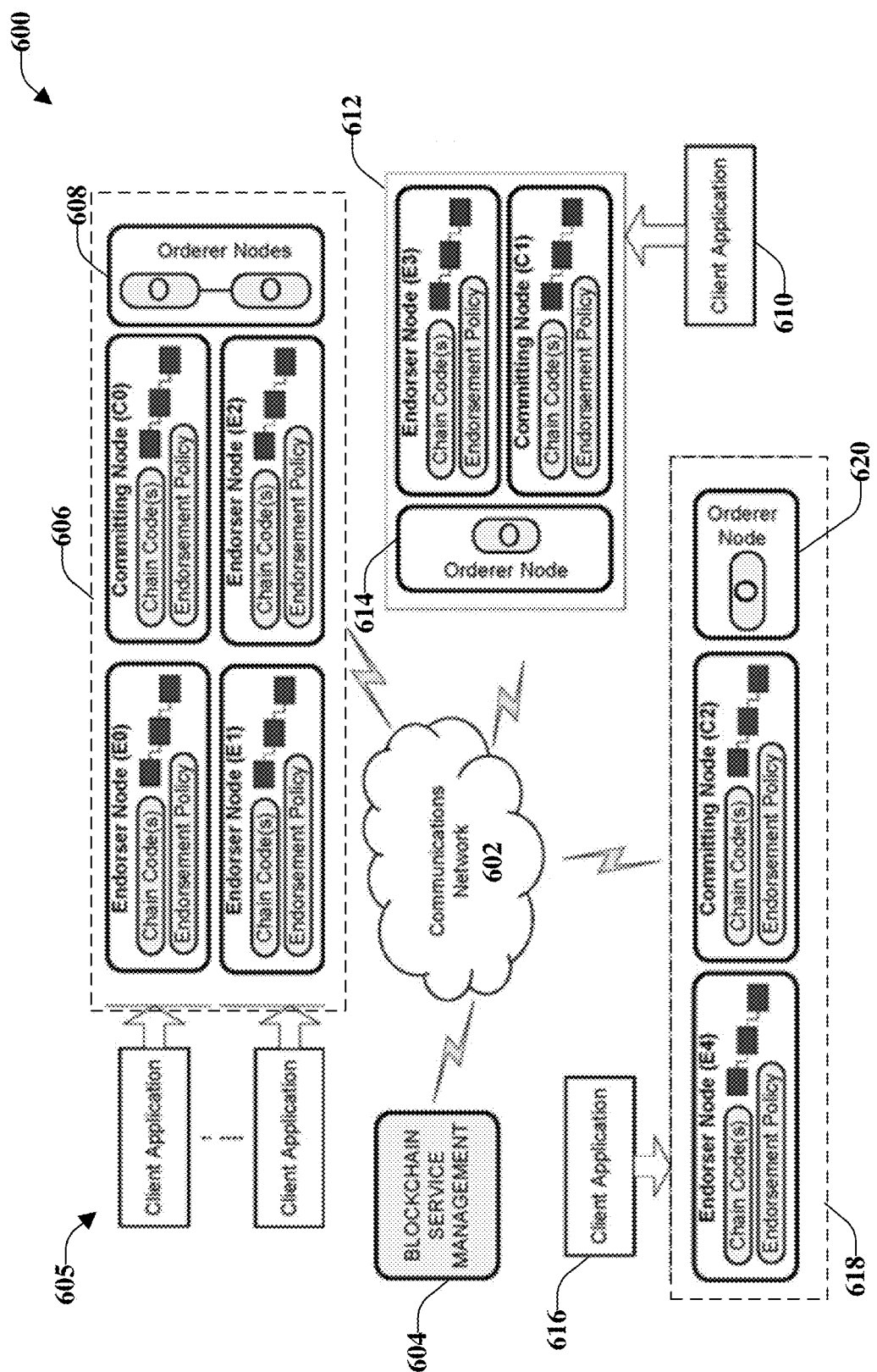
FIG. 6 illustrates an example, non-limiting blockchain network environment in accordance with one or more embodiments described herein.

FIG. 6 illustrates an example, non-limiting, blockchain network environment 600 in accordance with one or more embodiments described herein. As illustrated one or more wireless (or wired) communications links can be established between various entities, such as through a communications network 602. In an example, the communications network 602 can be a cloud computing network. A blockchain service management device 604 can facilitate performance of the one or more aspects discussed herein.

As illustrated, various nodes can be included within the blockchain network environment 600 and one or more client applications can interface (e.g., via one or more channels) with sets of the nodes that represent multiple locations and/or multiple regions. For example, one or more client applications 605, can interact with a first set of nodes 606, which can comprise endorser node (E0), endorser node (E1), endorser node (E2), committing node (C0), and orderer nodes 608. Further, another client application 610, can interact with a second set of nodes 612, which can comprise endorser node (E3), committing node (C1), and orderer node 614. In addition, client application 616, can interact with a third set of nodes 618, which can comprise endorser node (E4), committing node (C2), and order node 620. Although the orderer nodes are illustrated within different sets of nodes, the orderer nodes can be shared by all channels within the blockchain network. It is noted that although a certain number of nodes are illustrated and described with respect to one or more sets of nodes, the disclosed aspects are not limited to this implementation.

Figure 7:
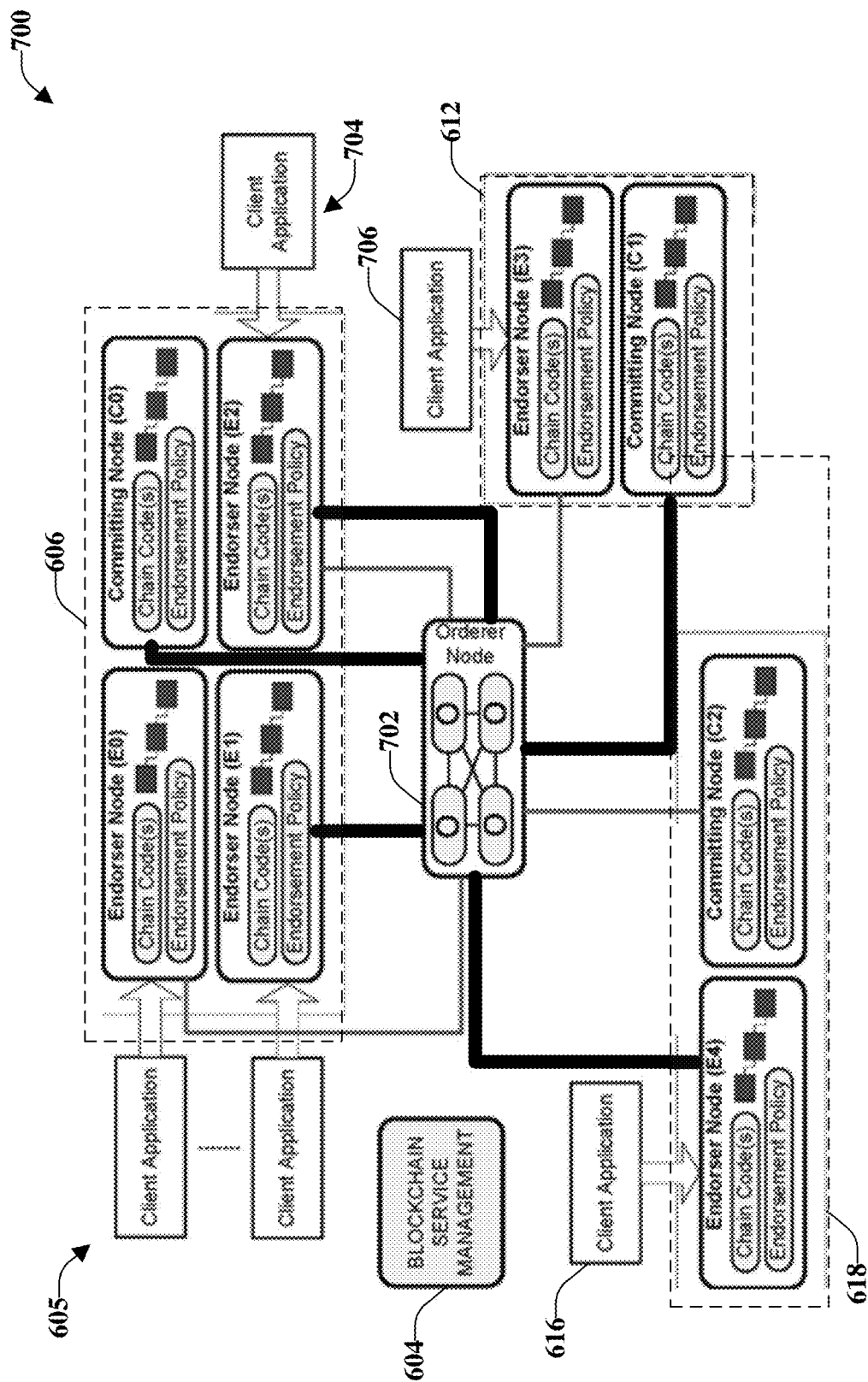
FIG. 7 illustrates another implementation of an example, non-limiting blockchain network environment in accordance with one or more embodiments described herein.

FIG. 7 illustrates another implementation of an example, non-limiting, blockchain network environment 700 in accordance with one or more embodiments described herein. Repetitive description of like elements employed in other embodiments described herein is omitted for sake of brevity.

In this example blockchain network environment 700, one or more orderer nodes 702 can support the one or more channels illustrated by the dark lines and light lines between nodes (e.g., endorser nodes, committing nodes, or other types of nodes). E0, E2, E3, and C2 are in one channel (e.g., represented by the light lines) and E1, E2, E4, C0, and C1 are in another channel (represented by the dark lines). In this example, there are no client specific orderer nodes. Endorser node E2 is used by both channels, as illustrated. Also, as illustrated one or more other client applications 605, 616, 704, and 706, can connect to a given channel Clients connecting to one channel are unaware of the existence of other channels, however, clients can connect to multiple channels.

Figure 8:
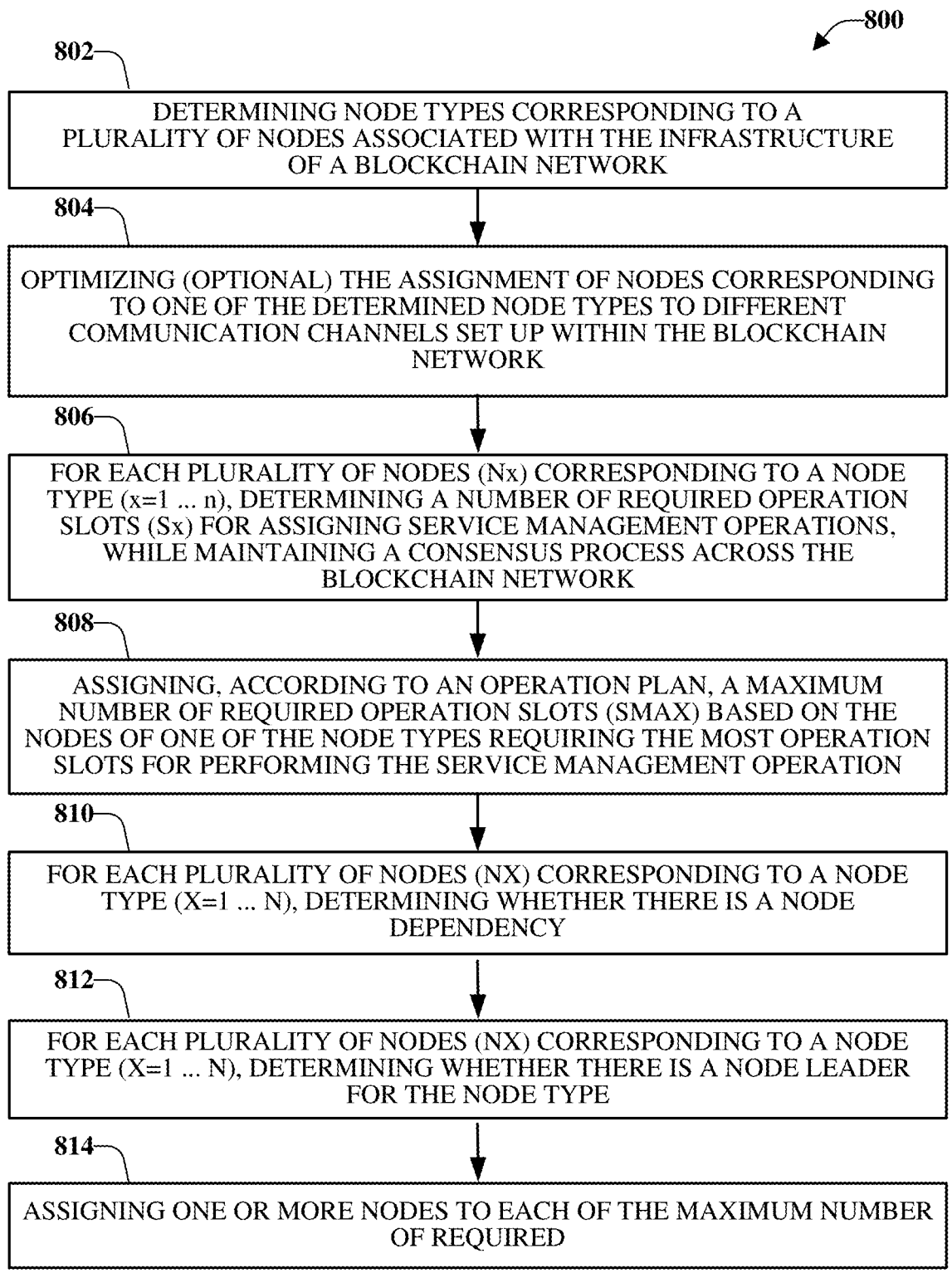
FIG. 8 illustrates a flow diagram of an example, non-limiting, computer-implemented method that facilitates service management for the infrastructure of blockchain networks in accordance with one or more embodiments described herein.

FIG. 8 illustrates a flow diagram of an example, non-limiting, computer-implemented method 800 that facilitates service management for the infrastructure of blockchain networks in accordance with one or more embodiments described herein. Repetitive description of like elements employed in other embodiments described herein is omitted for sake of brevity.

At 802, node types corresponding to a plurality of nodes associated with an infrastructure of a blockchain network can be determined. Optionally, at 804, the assignment of nodes corresponding to one or the determined node types can be optimized to different communication channels set up within the blockchain network.

Further, at 806, for one or more plurality of nodes ($N_x$) corresponding to a node type (e.g., x=1 . . . n), a number of required operation slots ($S_x$) for assigning service management operations can be determined. The number of required operation slots can be determined while maintaining a consensus process across the blockchain network. For example, particular nodes of a node type can be removed from service. Further to this example, the particular nodes can be removed, and a software patch can be deployed.

In accordance with an operation plan, at 808, a maximum number of required operation slots ($S_{max}$) can be assigned based on the nodes of one of the nodes types requiring the most operation slots for performing the service management operation. For one or more plurality of nodes ($N_x$) corresponding to a node type (x=1 . . . n), at 810, a determination can be made whether there is a node dependency.

Further, at 812, for one or more plurality of nodes ($N_x$) corresponding to a node type (x=1 . . . n), a determination can be made whether there is a node leader for the node type. The node leader can be the last node taken down to prevent and/or mitigate excessive leader switching, in accordance with one or more aspects discussed herein.

At 814, one or more nodes can be assigned to one or more of the maximum number of required operation slots ($S_{max}$) for performing the service management operation based on the operation plan, node dependencies, and the node leader. At least one slot of the maximum number of required operation slots ($S_{max}$) can include an aggregate of nodes of different node types.

Figure 9:
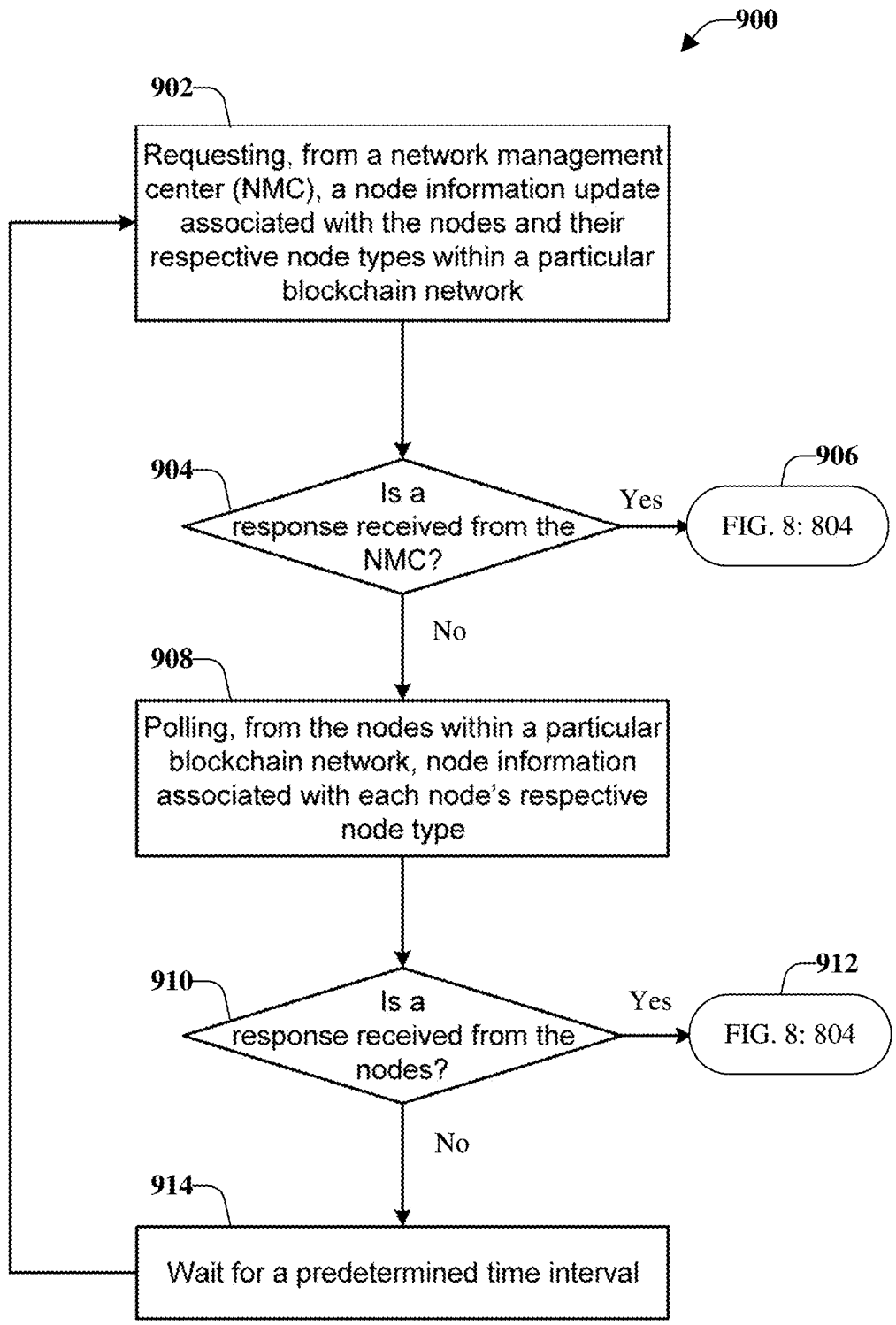
FIG. 9 illustrates a flow diagram of an example, non-limiting, computer-implemented method that facilitates determining node types corresponding to a plurality of nodes associated with an infrastructure of a blockchain network in accordance with one or more embodiments described herein.

FIG. 9 illustrates a flow diagram of an example, non-limiting, computer-implemented method 900 that facilitates determining node types corresponding to a plurality of nodes associated with an infrastructure of a blockchain network in accordance with one or more embodiments described herein. Repetitive description of like elements employed in other embodiments described herein is omitted for sake of brevity.

The computer-implemented method 900 can correspond to 802 of FIG. 8. In further detail, at 902, a request for a node information update associated with the nodes and their respective node types within a particular blockchain network can be requested from a network management center (NMC).

At 904, a determination can be made whether a response is received from the NMC. If a response is received ("YES"), the computer-implemented method 900 can continue at 906 and return to 804 of FIG. 8 for further processing. Alternatively, if the determination at 904 is that a response was not received ("NO"), at 908, node information associated with one or more node's respective node type can be polled. For example, the one or more nodes within a particular blockchain network can be polled.

At 910, a determination can be made whether a response is received from the one or more nodes in the particular blockchain network. If respective responses have been received from the one or more nodes "YES", the computer-implemented method 900 can continue at 912 and return to 804 of FIG. 8 for further processing.

Alternatively, if it is determined at 910 that respective responses from one or more nodes have not been received ("NO"), the computer-implemented method 900 can, at 914, wait for a predetermined time interval and then can return to 902 for further processing. For example, if only a set of the nodes responded, the processing according to the computer-implemented method 900 can be repeated for the remaining set of nodes that did not respond.

Figure 10:
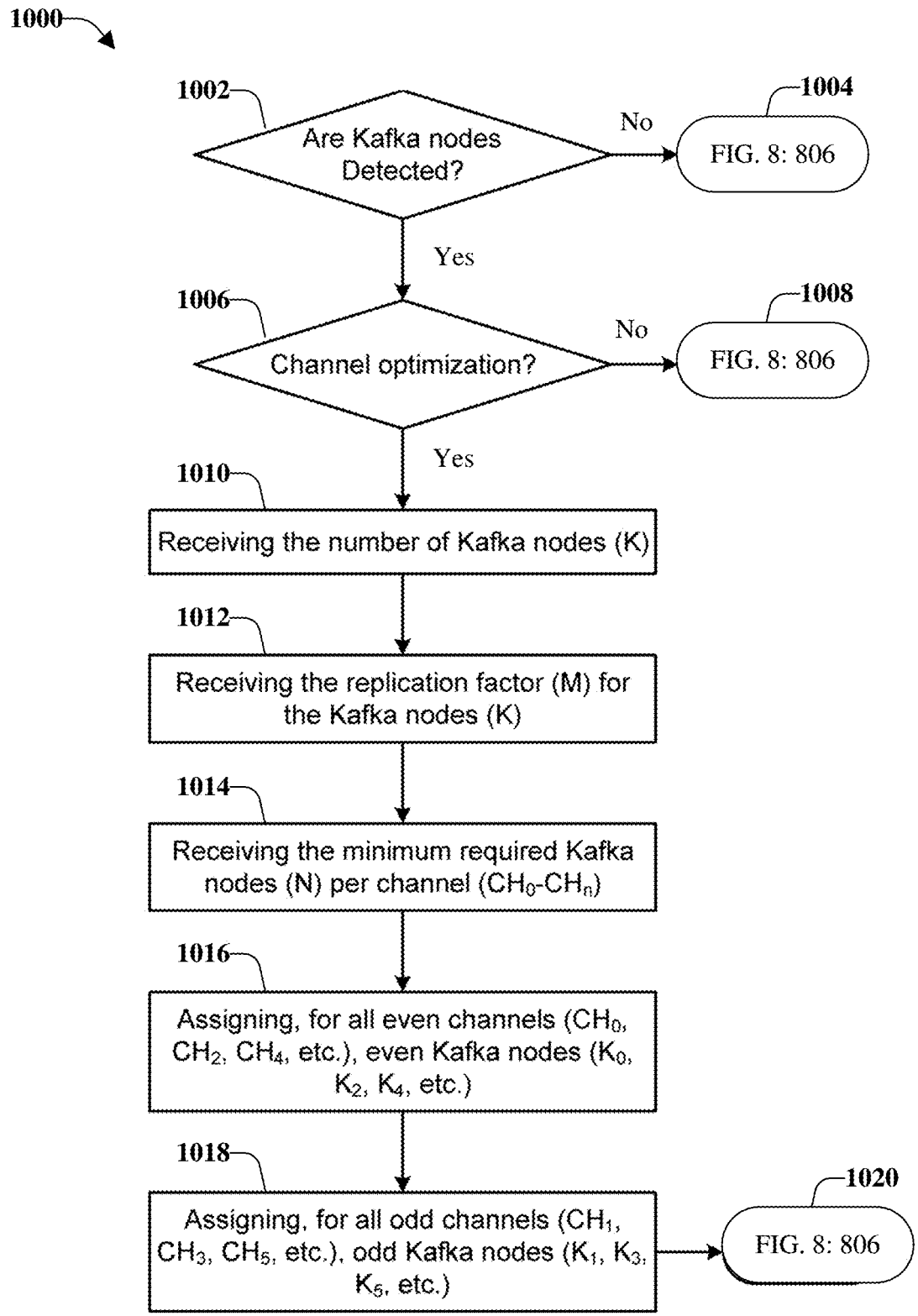
FIG. 10 illustrates a flow diagram of an example, non-limiting, computer-implemented method that facilitates optionally optimizing an assignment of nodes to different communication channels in accordance with one or more embodiments described herein.

FIG. 10 illustrates a flow diagram of an example, non-limiting, computer-implemented method 1000 that facilitates optionally optimizing an assignment of nodes to different communication channels in accordance with one or more embodiments described herein. Repetitive description of like elements employed in other embodiments described herein is omitted for sake of brevity.

The computer-implemented method 1000 can correspond to 804 of FIG. 8. The assignment of the nodes can be the assignment of nodes corresponding to one of the determined node types. Further, the different communication channels can be the different communication channels set up within the blockchain network.

At 1002, a determination can be made whether Kafka nodes are detected. If Kafka nodes are not detected ("NO"), the computer-implemented method 1000 can continue at 1004 and can return to 806 of FIG. 8 for further processing according. If the determination, at 1002, is that Kafka nodes are detected ("YES"), at 1006, a determination can be made whether channel optimization should be performed. If channel optimization should not be performed ("NO"), the computer-implemented method 1000 can continue at 1004 and can return to 806 of FIG. 8 for further processing.

Alternatively, if channel optimization should be performed ("YES"), at 1010, the number of Kafka nodes (K) can be received. Based on the number of Kafka nodes (K), at 1012, the replication factor (M) for the Kafka nodes (K) can be received. Further, at 1014 of the computer-implemented method 1000, the minimum required Kafka nodes (N) per channel ($CH_0$-$CH_n$) can be received.

For the specific example with six Kafka nodes with replication factor equal to three, for one or more even channels ($CH_0$, $CH_2$, $CH_4$), even Kafka nodes ($K_0$, $K_2$, $K_4$) can be assigned, at 1016. In a similar manner, for the one or more odd channels ($CH_1$, $CH_3$, $CH_5$, and so on), odd Kafka nodes ($K_1$, $K_3$, $K_5$) can be assigned, at 1016. Thereafter, the computer-implemented method 1000 can continue at 1020 and can return to 806 of FIG. 8 for further processing.

It is noted that the above example for odd nodes and even nodes applies to the specific example of FIG. 10. The following generic algorithm can work with any given number of Kafka nodes, Channels, Replication factor and Min InSync Replicas.

Generic Algorithm to Distribute the Kafka Nodes Across Channels

```
For each channel: 0 to MaxChannels do
    Start_Position=(ChannelNumber*Replication_Factor) mod
quotient(NumberKafkaNodes,ReplicationFactor)
    End_Position=Start_Position+Replication_Factor
    For each kafka_node: 0 to MaxKafkaNodes do
        If KafkaNodeNumber is between Start_Position and End_Position
            Assign the kafka_node to the channel
        EndIf
    EndFor
    If the MaxKafkaNodes >=
        quotient(NumberKafkaNodes,ReplicationFactor)*Replication_Factor then
        Distribute the load from a selected remainder(NumberKafkaNodes,ReplicationFactor) of
kafka nodes to these extra nodes
    EndIf
EndFor
```

Three example channel allocations generated by the Generic Algorithm are illustrated in FIGS. 26A through 26C.

Figures 11A, 11B:
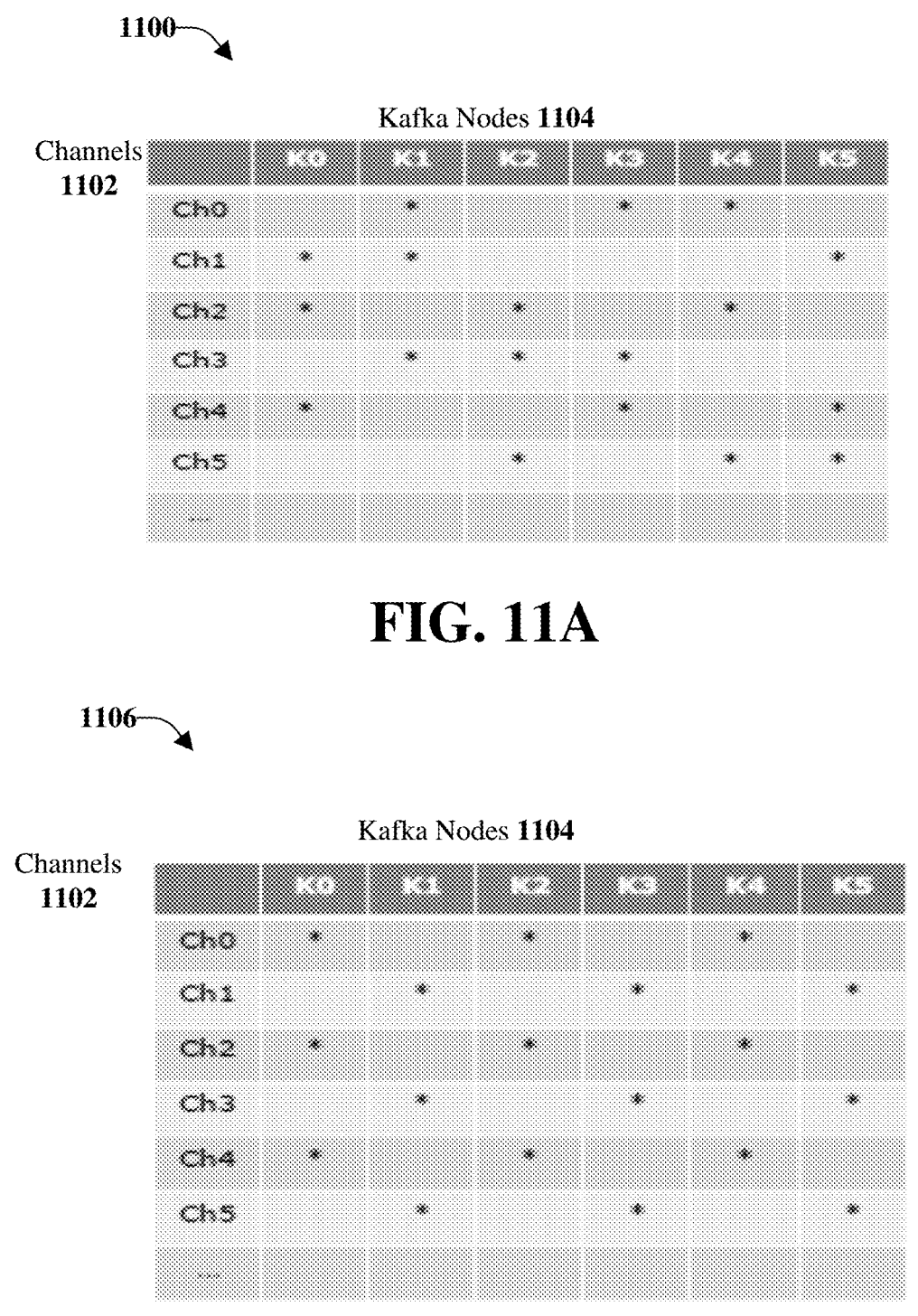

FIG. 11A illustrates an example, non-limiting, representation 1100 of uncontrolled usage of Kafka nodes. Channels 1102 are illustrated on the vertical axis and Kafka nodes 1104 are illustrated on the horizontal axis. The Kafka nodes (also called brokers) provide replicated storage of transaction logs. As utilized herein an unchanged fault tolerance is utilized. The fault tolerance performance is defined by default.replication.factor and min.insync.replicas, which are kept unchanged in accordance with one or more aspects. In this example the following applies: default.replication.factor=3 and min.insync.replicas=2. Thus, for a channel, its log is replicated over three Kafka brokers, where at least two brokers are to be alive to keep the channel accessible. In default settings, the channels choose their own set of brokers in an uncontrolled manner. The result is that the Kafka nodes can be mutually exclusive with one other. For example, brokers K1 and K3 are mutual exclusive, in the sense that they cannot be stopped simultaneously, otherwise, channel Ch0 will be inaccessible. It is noted that in this example, all pairs of brokers are mutually exclusive.

Kafka nodes can easily get entangled when more channels are created, which can cause challenges for management operations. For example, it can be difficult to identify a valid maintenance sequence (e.g., how to compose maintenance groups so that operations can be finished without interrupting the operations on the channels.) Further, a short maintenance sequence could be non-existent. In this example, since the pairs of brokers are mutually exclusive, the only possible approach is to deploy the six brokers on six distinct servers, and operate on them one after another. This approach is inefficient in terms of both the time consumption and server utilization, especially when the network scales up (e.g., when more Kafka nodes are included into the network). The various aspects discussed herein can overcome these efficiencies.

FIG. 11B illustrates an example, non-limiting, representation 1106 of controlled usage of Kafka nodes in accordance with one or more embodiments described herein. Repetitive description of like elements employed in other embodiments described herein is omitted for sake of brevity.

It is noted that the controlled usage of Kafka nodes in the representation 1106 is an example and other manners of controlling the usage can be utilized in accordance with the disclosed aspects. In this case, instead of letting the channels choose brokers arbitrarily, a set of brokers can be explicitly specified for the channels, as discussed herein. Various benefits can be achieved with this approach. For example, it can be easy to identify a valid maintenance sequence. Kafka brokers K0 and K1 can be stopped simultaneously, then brokers K2 and K3 can be stopped simultaneously, finally brokers K4 and K5 can be stopped simultaneously. During this procedure, all channels can be accessed without any interruptions.

Another benefit can be that operations can be performed efficiently. Instead of six steps (as with FIG. 11A), there are only three steps for the implementation of FIG. 11B. This is an adequate solution for this example, because for any channel, at most one broker can be stopped at any time. Furthermore, the benefits are more obvious when the network scales up. In fact, there are only three steps utilized for any number of Kafka nodes in this example.

By having Kafka nodes under control there can be easy and clear maintenance sequence identification without interruptions to channel operations. Further, there can be efficient management operations in terms of both time consumption and server utilization. Scalability can be handled with a constant length of maintenance sequence when the network scales up. Further, there can be an unchanged fault tolerance. The fault tolerance performance can be defined by default.replication.factor and min.insync.replicas, which is kept unchanged in accordance with the various aspects provided herein.

Figure 12:
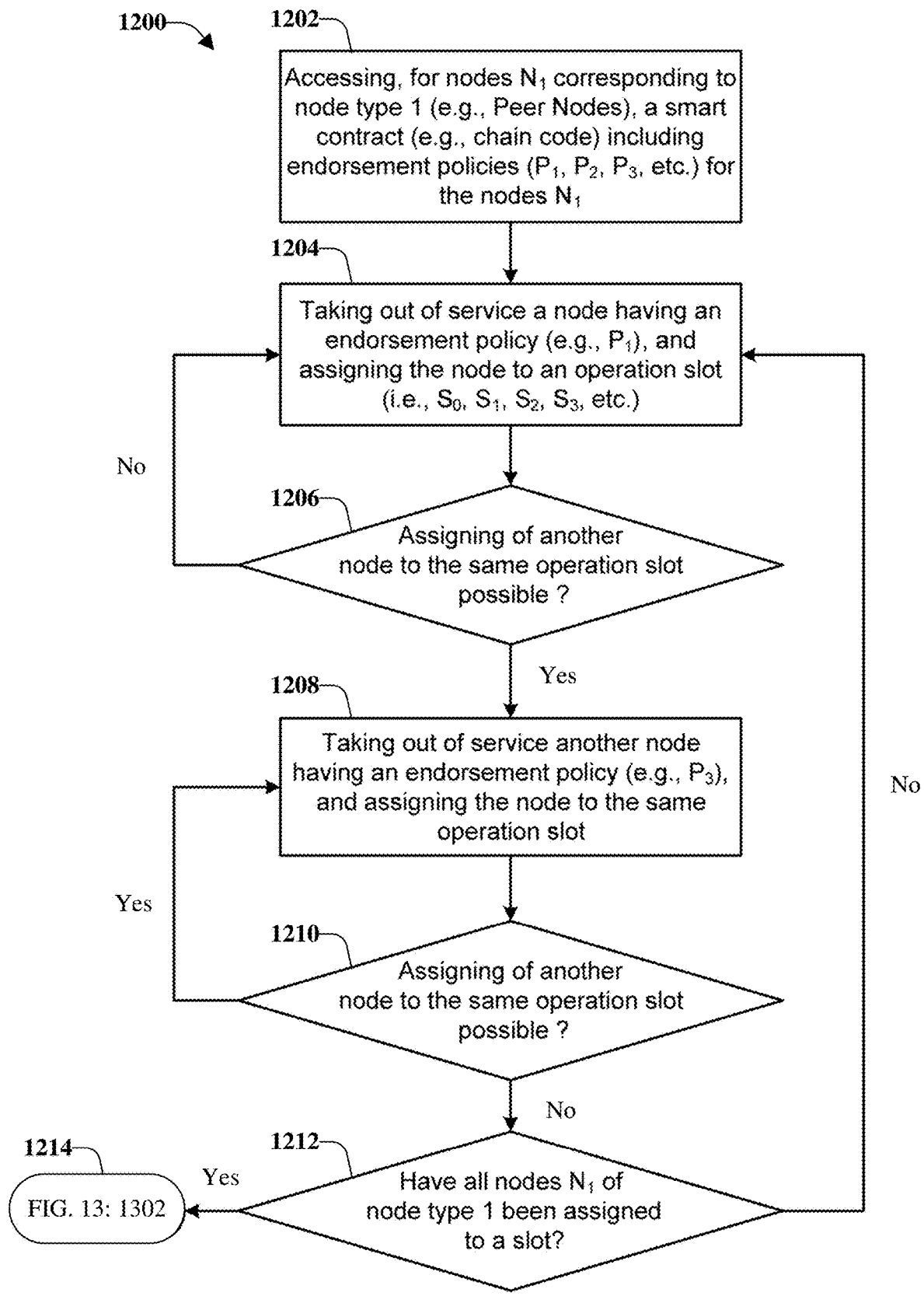
FIG. 12 illustrates a flow diagram of an example, non-limiting, computer-implemented method that facilitates determining a number of required operation slots for assigning service management operations in accordance with one or more embodiments described herein.

FIG. 12 illustrates a flow diagram of an example, non-limiting, computer-implemented method 1200 that facilitates determining a number of required operation slots for assigning service management operations in accordance with one or more embodiments described herein. Repetitive description of like elements employed in other embodiments described herein is omitted for sake of brevity.

The computer-implemented method 1200 can correspond to 806 of FIG. 8. The determination of the required operation slots for assigning service management operations can be performed while maintaining a consensus process across the blockchain network. At 1202, for nodes $N_1$ corresponding to node type 1, a smart contract including endorsement policies for the nodes $N_1$ can be accessed. According to an implementation, the node type 1 can be peer nodes. Further to this implementation, the endorsement policies can be, for example, endorsement policies $P_1$, $P_2$, $P_3$, and so on.

A node can be taken out of service and assigned to an operation slot, at 1204. For example, the node can be a node having an endorsement policy (e.g., endorsement policy $P_1$). Further, the node can be assigned to an operation slot selected from operation slots $S_0$, $S_1$, $S_2$, $S_3$, and so on.

At 1206, a determination can be made whether an assignment of another node to the same operation slot is possible. If not possible ("NO"), return to 1204 and another node can be taken out of service and assigned to a different operation slot. If it is determined that another node can be assigned to the same operation slot ("YES"), at 1208, another node can be taken out of service and assigned to the same operation. For example, the other node can be a node having a different endorsement policy (e.g., endorsement policy $P_3$).

At 1210, another determination can be made whether another node can be assigned to the same operation slot. If the determination is that another node can be assigned to the same operation slot ("YES"), return to 1208 and a further node can be taken out of service and assigned to the operation slot. It is noted that this can be recursive.

If the determination at 1210 is that another node cannot be assigned to the same operation slot, continue at 1212 and a determination can be made whether all nodes $N_1$ of the first node type 1 have been assigned to a slot. If all nodes $N_1$ of the first type 1 have not been assigned to a slot ("NO"), return to 1204. If all nodes $N_1$ of the first type 1 have been assigned to a slot ("YES"), continue, at 1214, as will be discussed with respect to a computer-implemented method 1300 of FIG. 13.

Figure 13:
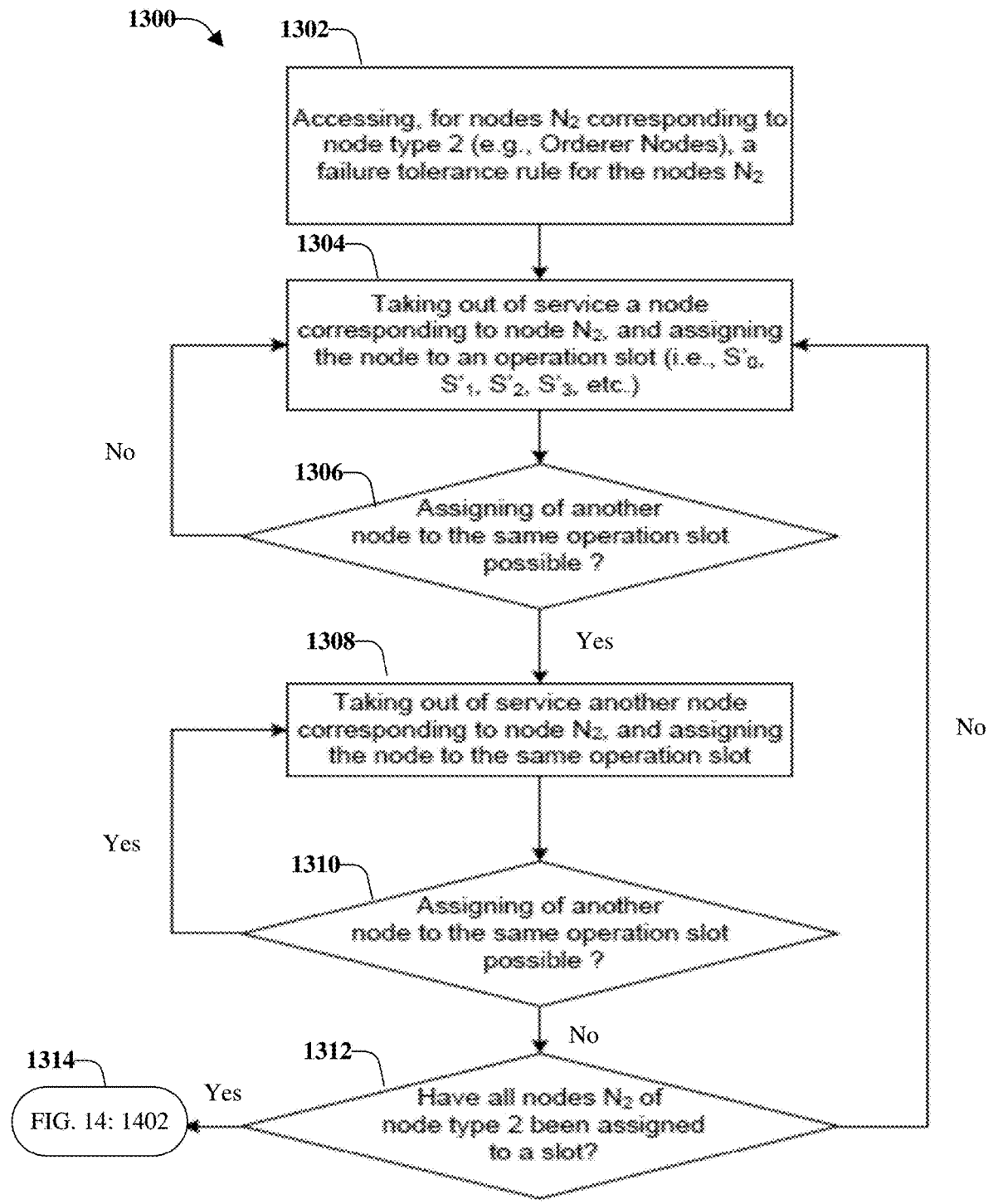
FIG. 13 illustrates a flow diagram of an example, non-limiting, computer-implemented method that facilitates continuing a determination of a number of required operation slots for assigning service management operations in accordance with one or more embodiments described herein.

FIG. 13 illustrates a flow diagram of an example, non-limiting, computer-implemented method 1300 that facilitates continuing a determination of a number of required operation slots for assigning service management operations in accordance with one or more embodiments described herein. Repetitive description of like elements employed in other embodiments described herein is omitted for sake of brevity.

At 1302, for nodes $N_2$ corresponding to node type 2, a failure tolerance rule $N_2$ can be accessed. In an example, the nodes $N_2$ can be orderer nodes. A node corresponding to node $N_2$ can be taken out of service and assigned to an operation slot, at 1304. For example, the operation slot can be a slot selected from operation slots $S'_0$, $S'_1$, $S'_2$, $S'_3$ and so on.

A determination can be made, at 1306, whether another node can be assigned to the same operation slot. If another node cannot be assigned ("NO"), return to 1304. If another node can be assigned ("YES"), at 1308, another node corresponding to node $N_2$ can be taken out of service and assigned to the same operation slot.

Proceeding to 1310, a determination can be made whether another node can be assigned to the same operation slot. If so ("YES"), return to 1308. If, however, another node cannot be assigned ("NO"), at 1312, a determination is made whether all nodes $N_2$ of node type 2 have been assigned to a slot.

If all nodes $N_2$ of node type 2 have not been assigned to a slot ("NO"), return to 1304 and another node can be taken out of service. Alternatively, if the determination at 1312 is that all nodes $N_2$ of node type 2 have been assigned to a slot ("YES"), continue at 1314, as will be discussed with respect to a computer-implemented method 1400 of FIG. 14.

Figure 14:
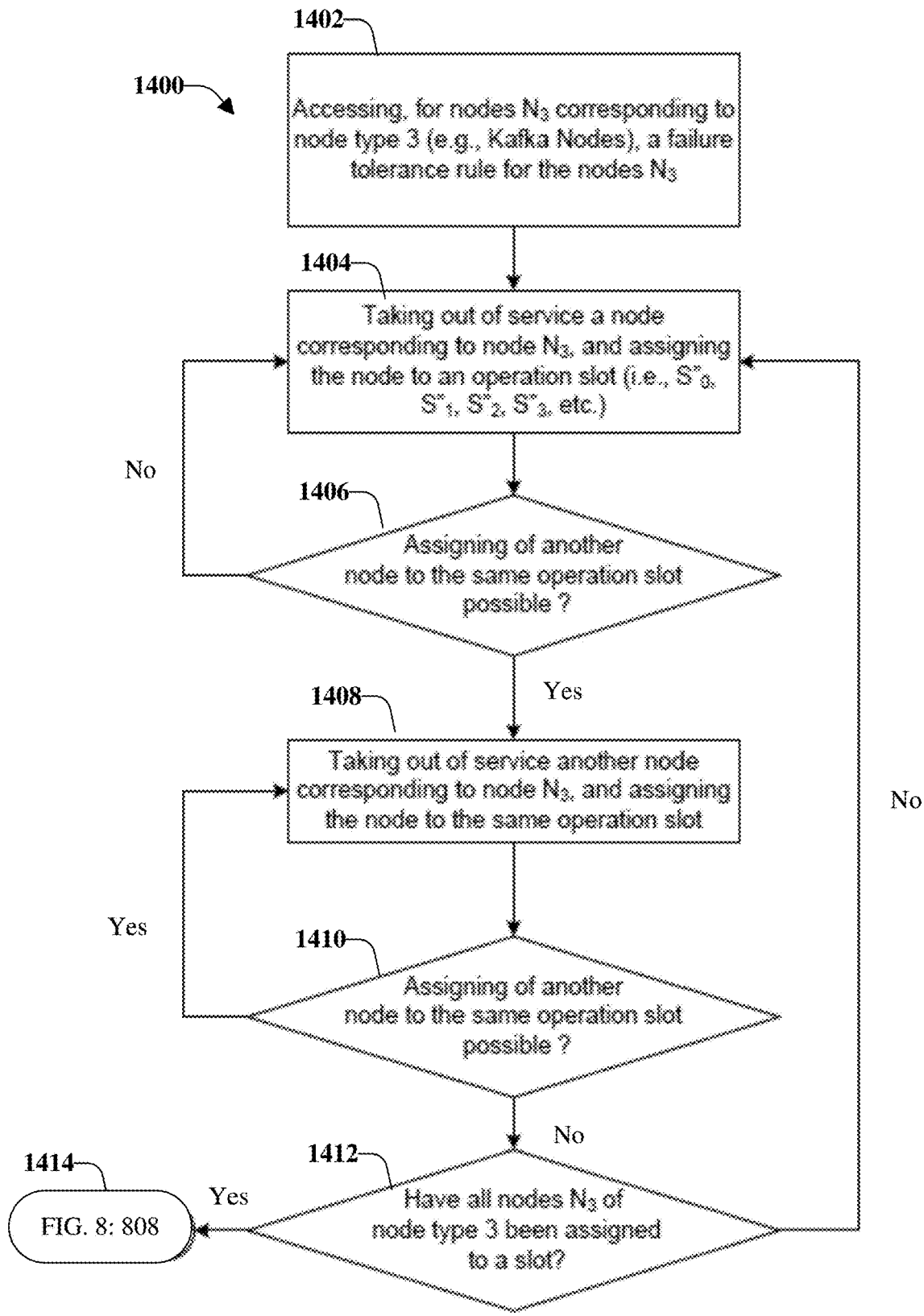
FIG. 14 illustrates a flow diagram of an example, non-limiting, computer-implemented method that continues the determination of the number of required operation slots for assigning service management operations in accordance with one or more embodiments described herein.

FIG. 14 illustrates a flow diagram of an example, non-limiting, computer-implemented method 1400 that continues the determination of the number of required operation slots for assigning service management operations in accordance with one or more embodiments described herein. Repetitive description of like elements employed in other embodiments described herein is omitted for sake of brevity.

At 1402, for nodes $N_3$ corresponding to node type 3, a failure tolerance rule $N_3$ can be accessed. In an example, the nodes $N_3$ can be Kafka nodes. A node corresponding to node $N_3$ can be taken out of service and assigned to an operation slot, at 1404 of the computer-implemented method 1400. For example, the operation slot can be a slot selected from operation slots $S''_0$, $S''_1$, $S''_2$, $S''_3$ and so on.

A determination can be made, at 1406 whether another node can be assigned to the same operation slot. If another node cannot be assigned ("NO"), return to 1404 and another node can be assigned to a different operation slot. If it is determined at 1406 that another node can be assigned ("YES"), at 1408, another node corresponding to node $N_2$ can be taken out of service and assigned to the same operation slot.

Proceeding to 1410, a determination can be made whether another node can be assigned to the same operation slot. If so ("YES"), return to 1408. If, however, another node cannot be assigned ("NO"), at 1412, a determination is made whether all nodes $N_3$ of node type 3 have been assigned to a slot.

If all nodes $N_3$ of node type 3 have not been assigned to a slot ("NO"), return to 1404 and another node can be taken out of service. Alternatively, if the determination at 1412 is that all nodes $N_3$ of node type 3 have been assigned to a slot, continue at 1414 and can return to 808 of FIG. 8 for further processing according to the computer-implemented method 800.

Figure 15:
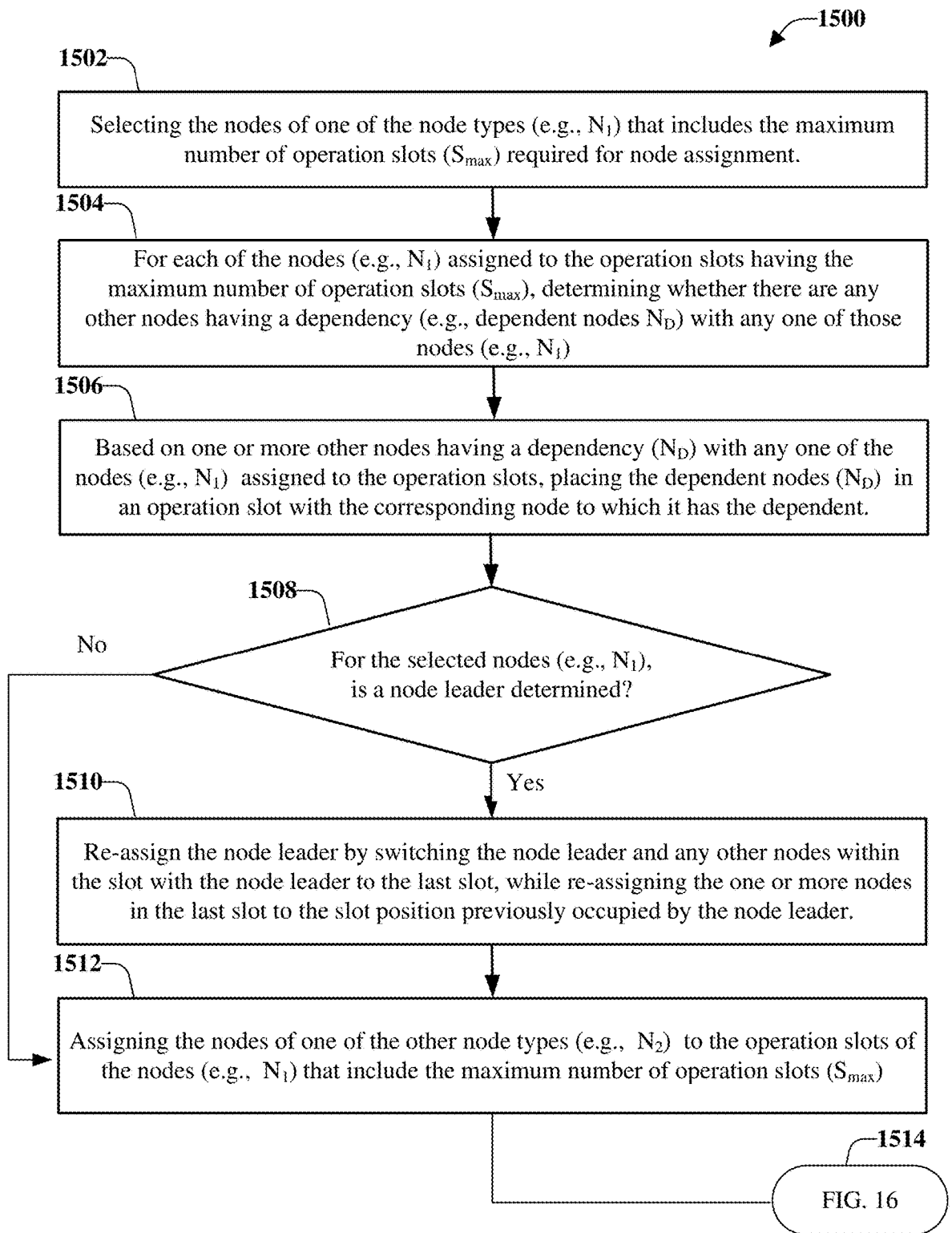
FIG. 15 illustrates a flow diagram of an example, non-limiting, computer-implemented method for assigning one or more nodes to a maximum number of required operation slots for performing the service management operation in accordance with one or more embodiments described herein.

FIG. 15 illustrates a flow diagram of an example, non-limiting, computer-implemented method 1500 for assigning one or more nodes to a maximum number of required operation slots for performing the service management operation in accordance with one or more embodiments described herein. Repetitive description of like elements employed in other embodiments described herein is omitted for sake of brevity.

The computer-implemented method 1500 can correspond to 814 of FIG. 8. At 1502, the nodes of one of the types (e.g., $N_1$) that includes the maximum number of operation slots ($S_{max}$) required for node assignment can be selected. For nodes of the one or more nodes (e.g., $N_1$) assigned to the operation slots having the maximum number of operations slots ($S_{max}$), at 1504, determine whether there are any other nodes having a dependency (e.g., dependent nodes $N_D$) with any one of the nodes (e.g., $N_1$).

Based on the one or more other nodes having a dependency ($N_D$) with any one of the nodes (e.g., $N_1$) assigned to the operation slots, at 1506, place the dependent nodes ($N_D$) in an operation slot with the corresponding node to which it has the dependency.

A determination can be made, at 1508, whether a node leader can be determined for the selected nodes (e.g., $N_1$). If a node leader can be determined ("YES"), at 1510, the node leader can be re-assigned by switching the node leader and any other nodes within the slot with the node leader to the last slot. Re-assigning the node leader can occur while re-assigning the one or more nodes in the last slot the slot position previously occupied by the node leader, for example.

Upon or after the node leader has been re-assigned, at 1510, or if the determination, at 1508 is that the node leader cannot be determined ("NO"), continue at 1512, and nodes of one of the other nodes types (e.g., $N_2$) can be assigned to operation slots of the nodes (e.g., $N_1$) that include the maximum number of operation slots ($S_{max}$). The computer-implemented method 1500 can continue to FIG. 16.

Figure 16:
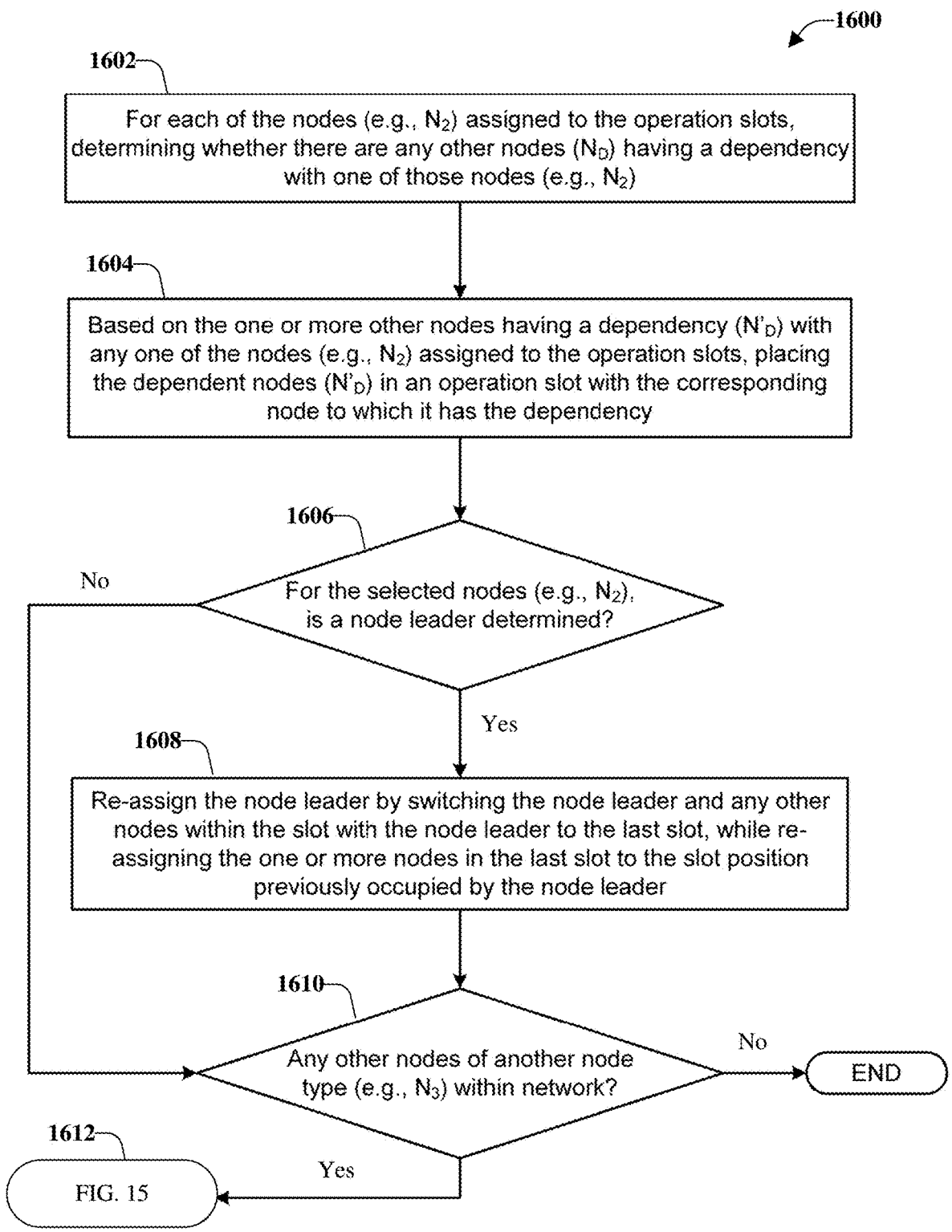
FIG. 16 illustrates a flow diagram of an example, non-limiting, computer-implemented method for continuing to assign one or more nodes to a maximum number of required operation slots for performing the service management operation in accordance with one or more embodiments described herein.

FIG. 16 illustrates a flow diagram of an example, non-limiting, computer-implemented method 1600 for continuing to assign one or more nodes to a maximum number of required operation slots for performing the service management operation in accordance with one or more embodiments described herein. Repetitive description of like elements employed in other embodiments described herein is omitted for sake of brevity.

At 1602, for nodes of the one or more nodes (e.g., $N_2$) assigned to the operation slots, determine whether there are any other nodes ($N_d$) having a dependency with one of those nodes (e.g., $N_2$). Based on the one or more other nodes having a dependency ($N'_D$) with any one of the nodes (e.g., $N_2$) assigned to the operation slots, at 1604, place the dependent nodes ($N'_D$) in an operation slot with the corresponding node to which it has the dependency.

For the selected nodes (e.g., $N_2$), at 1606, a determination can be made whether a node leader can be determined. If a node leader can be determined ("YES"), at 1608, the node leader can be re-assigned by switching the node leader and any other nodes within the slot with the node leader to the last slot. Re-assigning the node leader can occur while re-assigning the one or more nodes in the last slot the slot position previously occupied by the node leader, for example.

Upon or after the node leader has been re-assigned, at 1608, or if the determination, at 1606 is that the node leader cannot be determined ("NO"), continue at 1610, and a determination is made whether there are any other nodes of another node type (e.g., $N_3$) within the network. If there are nodes of another node type in the network ("YES"), the computer-implemented method 1600 can return to FIG. 15. If there are no nodes of another node type in the network ("NO"), the computer-implemented method 1600 can end.

Figure 17:
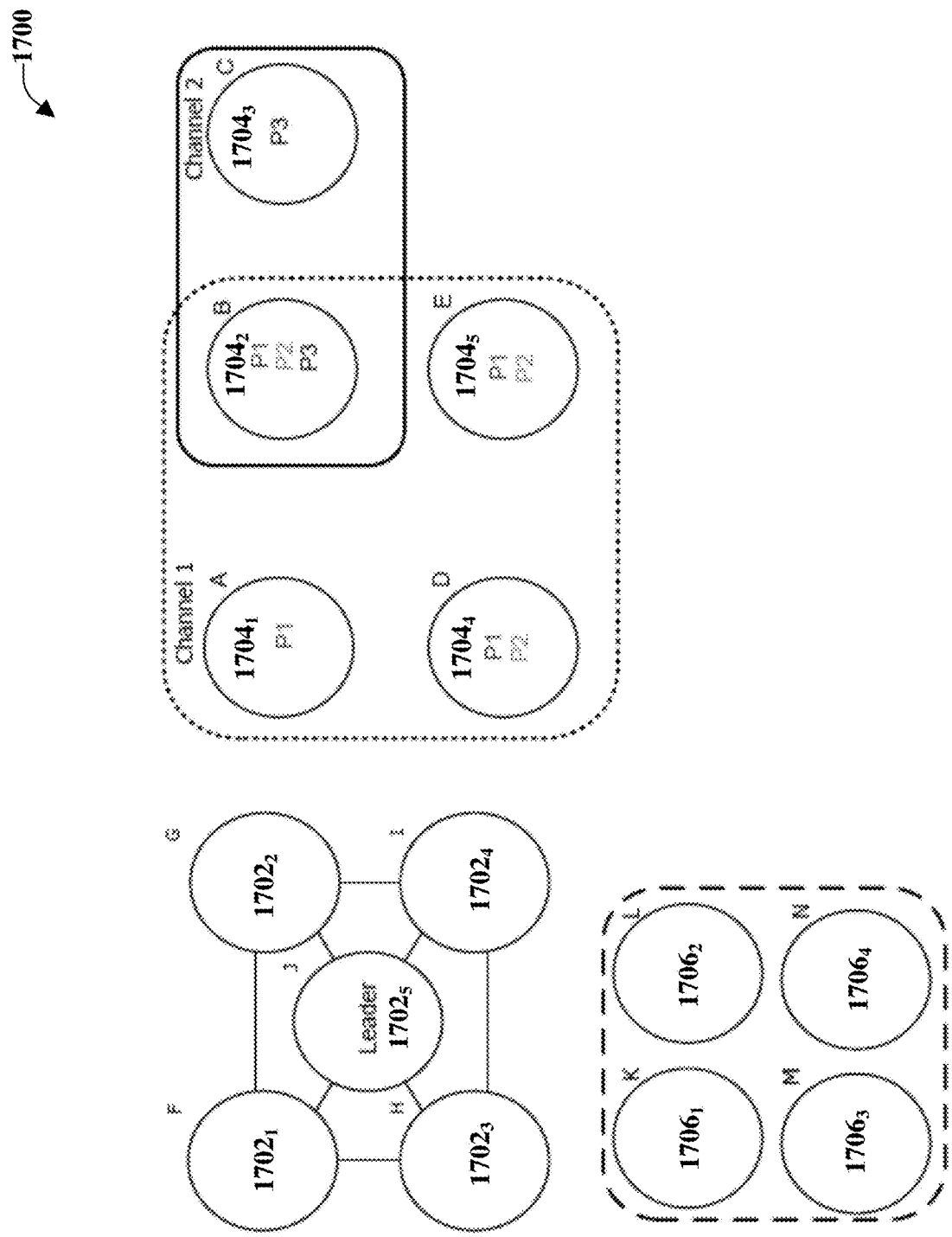
FIG. 17 illustrates a non-limiting, schematic representation of a multiple roles example in accordance with one or more embodiments described herein.

FIG. 17 illustrates a non-limiting, schematic representation of a multiple roles example 1700 in accordance with one or more embodiments described herein. This example illustrates three different nodes. Illustrate at the top left of the figure are one or more zookeeper nodes 1702, which can alternatively be ordering nodes (e.g., zookeeper nodes and ordering nodes behave in a similar manner). At the top right are one or more endorsement nodes 1704, and at the bottom left are one or more Kafka nodes 1706.

Zookeeper nodes can coordinate the behaviors of the Kafka nodes, by presenting distributed and consistent configurations. For example, a configuration can specify that all transaction history of a first channel 4, as illustrated in FIG. 11A, can be replicated by three Kafka brokers numbered 3, 5 and 0. Sitting at the heart of the blockchain network, zookeeper nodes follow a simple rule from the consensus protocol: N>2 f+1. Therefore, during the maintenance, it should be guaranteed that strictly more than half of the zookeeper nodes are up at any time. Otherwise the entire blockchain network will be down.

As illustrated there are five zookeeper nodes, namely, zookeeper node F $1702_1$, zookeeper node G $1702_2$, zookeeper node H $1702_3$, zookeeper node I $1702_4$, and zookeeper node J $1702_5$. The zookeeper node J $1702_5$ is a leader zookeeper node. There are five peer nodes or endorsement nodes, namely, endorsement node A $1704_1$, endorsement node B $1704_2$, endorsement node C $1704_3$, endorsement node D $1704_4$, and endorsement node E $1704_5$.

The peer nodes (e.g., the endorsement nodes 1704) are illustrated with policy labels, P1, P2, and/or P3. There can be a number of policies and the endorsement nodes 1704 can represent three different policies. For example, a first policy P1 is that there should be at least three nodes alive (e.g., not taken down) in the network. Thus, at least one peer node from respective business participants are necessary to endorse the transaction proposal. A second policy P2 is that there should be at least two nodes alive in the network.

Further, a third policy P3 is that there should be at least one node alive in the network. As will be illustrated in FIG. 18, one or more peer nodes can be taken down (e.g., at least temporarily removed from service) in such a manner that endorsement is not impacted. It is noted that, a SmartContract can be referred to as a Chaincode in a hyperledger fabric.

Further, there are four Kafka nodes, namely, Kafka node K $1706_1$, Kafka node L $1706_2$, Kafka node M $1706_3$, and Kafka node N $1706_4$. In the case of Kafka nodes, the policy can be defined. Further, for the Kafka nodes (K) where K is equal to 4. Minimum insync replicas, M can be equal to 2. In addition, for a default.replication.factor, N can be equal to 3. In this example there can be a policy that, M can be less than N, which can be less than K (M<N<K). This policy can be determined based on deployment of Kafka nodes at a consensus mechanism. In this example, M is equal to 2 and N is equal to 3. In some implementations, there can be a larger K, which can allow for different values of M and N. It is noted that there can be more than three types of nodes, however, only three are illustrated and described for simplicity purposes.

Figure 18:
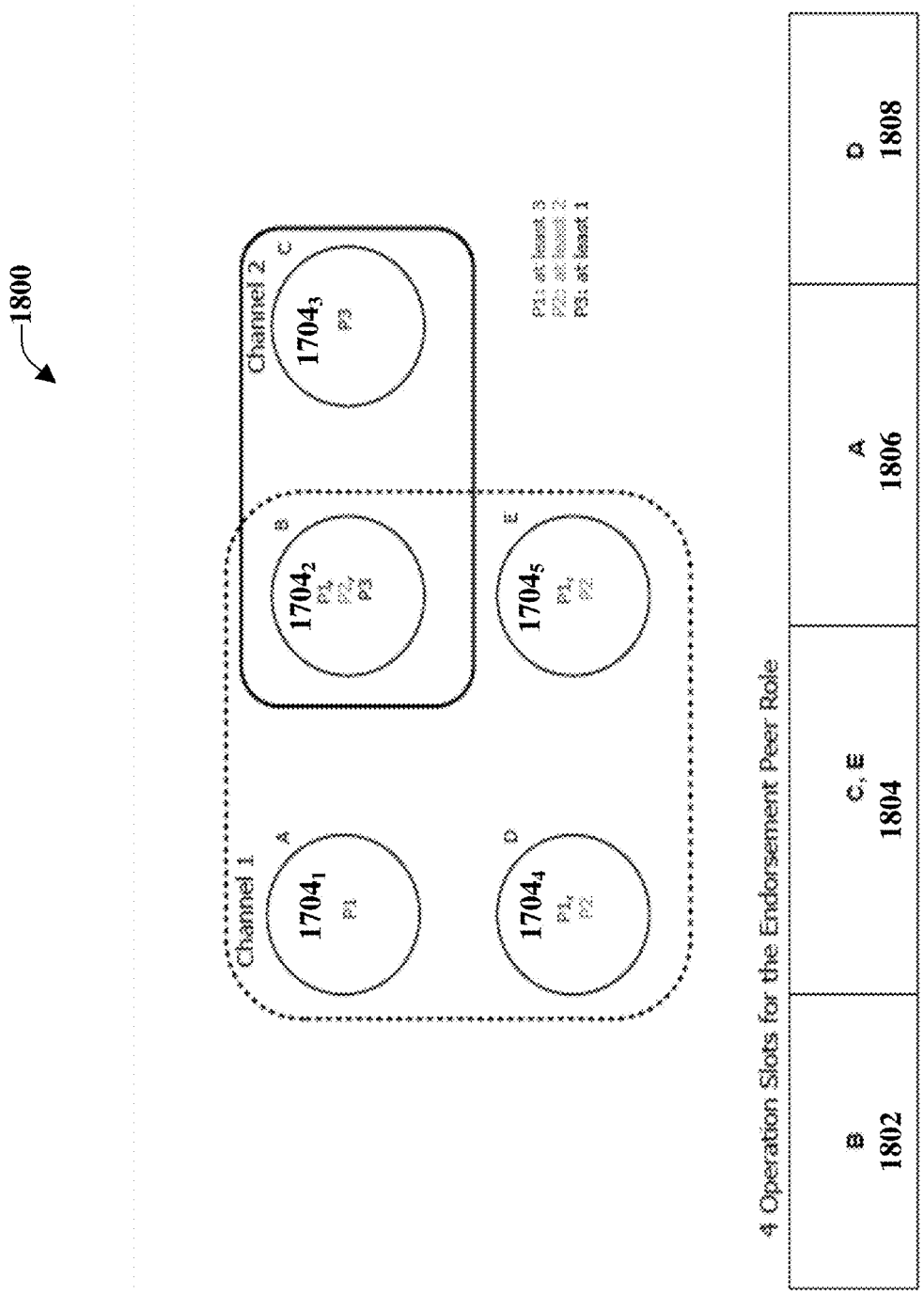
FIG. 18 illustrates an example, non-limiting endorsement policy representation of FIG. 17 in accordance with one or more embodiments described herein.

FIG. 18 illustrates an example, non-limiting endorsement policy representation 1800 of FIG. 17 in accordance with one or more embodiments described herein. Repetitive description of like elements employed in other embodiments described herein is omitted for sake of brevity.

In this example, first select Node B (e.g., endorsement node B $1704_2$) to be taken down. Even if Node B is taken down, P1, P2, and P3, one instance of each node will go down and, therefore, one node will not be available for performing P1. This is acceptable because there are three other nodes, the endorsement node A $1704_1$, the endorsement node D $1704_4$, and the endorsement node E $1704_5$ that can service the P1 policy. Therefore, if a transaction required an answer from three nodes, an answer can be provided even if Node B is taken down.

A similar situation occurs for policy P2 because if two responses should be returned, the endorsement node D $1704_4$ and the endorsement node E $1704_5$ are alive. In addition, for Policy P3, because the endorsement node C $1704_3$ is alive, a response can be received from the endorsement node C $1704_3$.

As illustrated by the example, there are four operation slots for the endorsement peer role 1802. A first slot 1804, is illustrated with B, however, B does not need to be in the first slot 1804. The second slot 1806 is for Node C and Node E, which can be taken down because even if Node C is taken down, P3 is still alive because at that time, node B has been patched and brought back up, so Node B is still alive. Further, node E can be taken down because even if P2 goes down, B is available. The third slot 1808 is for Node A, and a fourth slot 1810 is for Node D. Therefore, there is Node A, Node B, and Node D, which can service policy P1. There are also Node D and Node B, which can service policy P2 also. It is noted that Node A and Node D can be taken down in any order.

In other words, for the first role, the requirements have been subdivided into four different slots, the first slot 1804, the second slot 1806, the third slot 1808, and the fourth slot 1810. Accordingly, a determination can be made related to how many slots are required, which can be performed independently for the different types of nodes. In this example, four operation slots for the endorsement peer role, as illustrated in FIG. 18, were determined, which is also the maximum number in this example.

It is noted that FIG. 18 illustrates a multi-channel, with multiple endorsement policies within a single channel (installed chaincode on the nodes). Further other roles can include, but are not limited to, orderer, Kafka, zookeeper, CouchDB, ChainCode, and so on.

Figure 19:
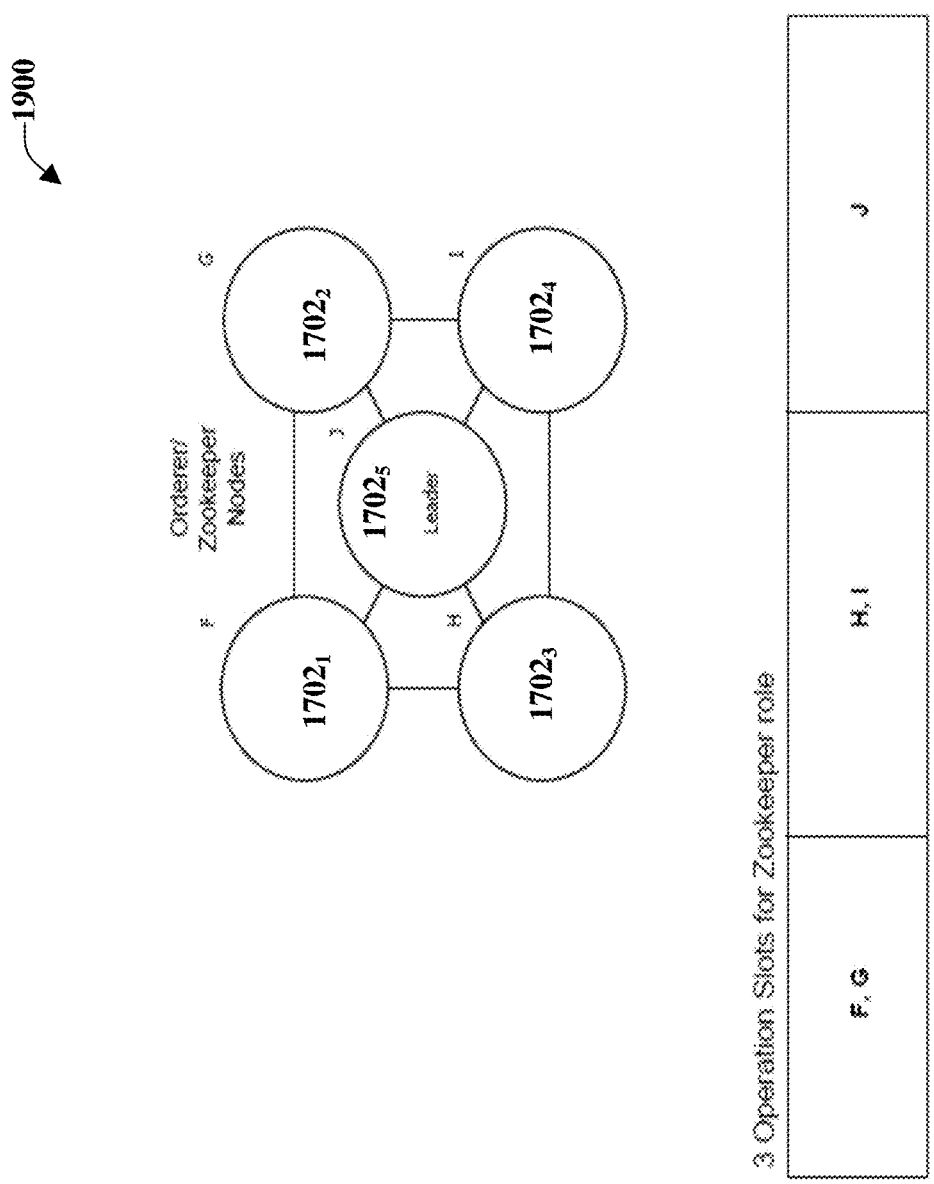
FIG. 19 illustrates an example, non-limiting orderer node policy representation of FIG. 17 in accordance with one or more embodiments described herein.

FIG. 19 illustrates an example, non-limiting orderer node policy representation 1900 of FIG. 17 in accordance with one or more embodiments described herein. Repetitive description of like elements employed in other embodiments described herein is omitted for sake of brevity.

For the orderer nodes, to tolerate f failures, N is equal to 2 f+1. There are five nodes and can take down up to f=2 nodes at a time. An ensemble with five zookeeper nodes can require three to form a quorum. Thus, an ensemble of five allows two peers to fail and still maintain a quorum. The example of FIG. 19 utilizes three slots, illustrated by the operation slots for the zookeeper role 1902. First, Nodes F and G can be taken down, then Nodes H and I can be taken down, then Node J can be taken down. Node J is taken down last because Node J is the leader.

Figure 20:
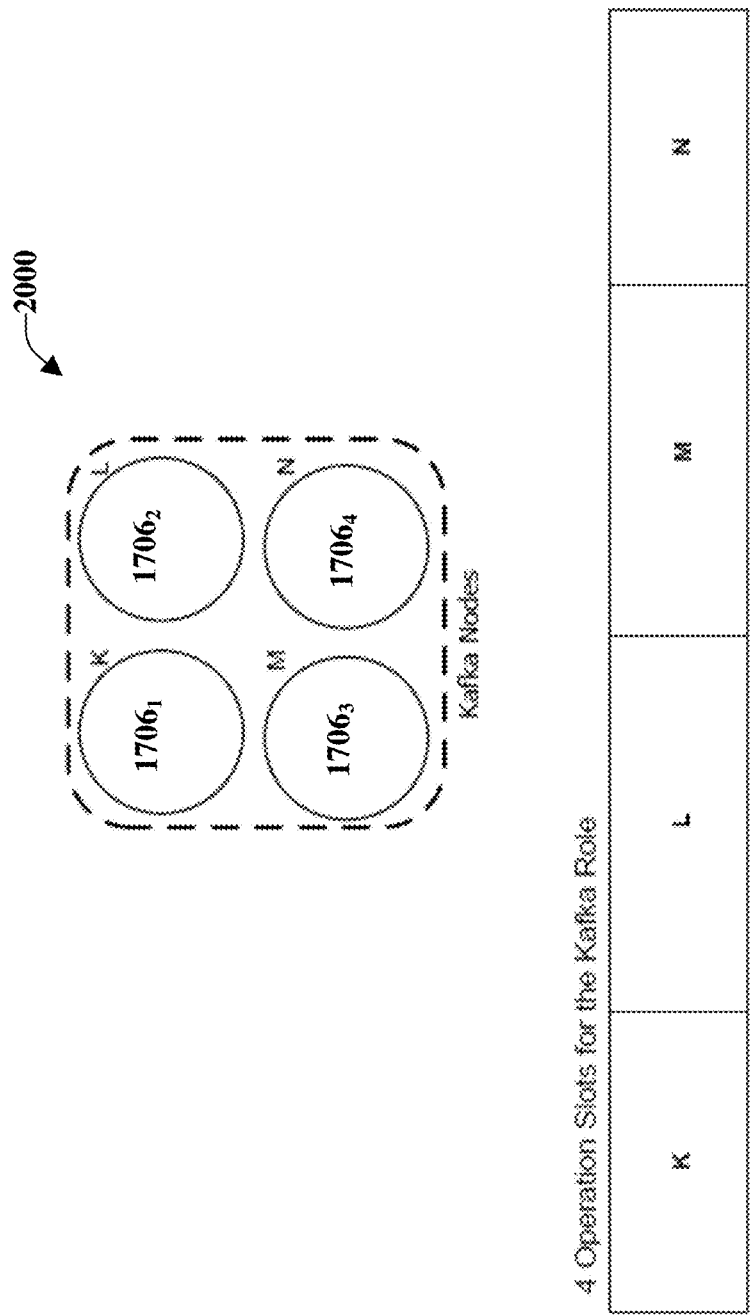
FIG. 20 illustrates an example, non-limiting Kafka node policy representation of FIG. 17 in accordance with one or more embodiments described herein.

FIG. 20 illustrates an example, non-limiting Kafka node policy representation 2000 of FIG. 17 in accordance with one or more embodiments described herein. Repetitive description of like elements employed in other embodiments described herein is omitted for sake of brevity.

The Kafka node operates similar to the other nodes illustrated in FIGS. 18 and 19. For Kafka, only one node can be taken down at a time so that channel creation is not affected. Although the operation slots for the Kafka role 2002 illustrate a particular order, Node K, Node L, Node M, then Node N, the nodes can be taken down in any order.

Figure 21:
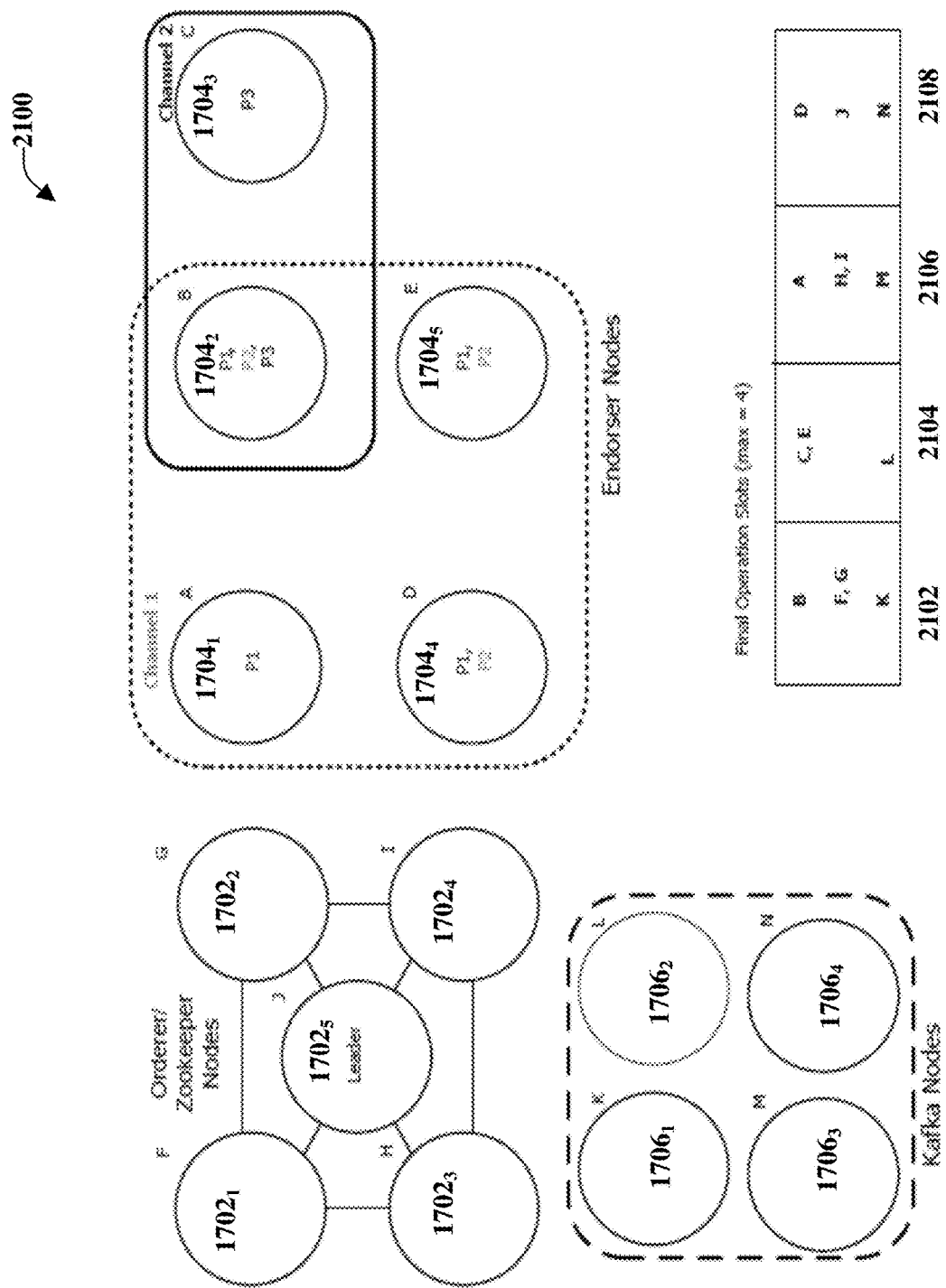
FIG. 21 illustrates an example, non-limiting representation of the multiple roles merged in accordance with one or more embodiments described herein.

FIG. 21 illustrates an example, non-limiting representation 2100 of the multiple roles merged in accordance with one or more embodiments described herein. Repetitive description of like elements employed in other embodiments described herein is omitted for sake of brevity.

The multiple roles can be merged to maintain a balanced load. The final operation slots, illustrate how the service management operations can be performed. In the first slot 2102, take down Node B, Node F, Node J, and Node K. In the second slot 2104, taken down Node C, Node E, and Node L. In the third slot 2106, take down Node A, Node H, Node I, and Node M. In the fourth slot 2108, take down Node D, Node J, and Node N.

According to some implementations, there could be a minimum number of nodes and, therefore, no nodes can be taken down. In this situation, an extra temporary node can be added for a defined role. Then, one node at a time can be taken down until all nodes are patched. Alternatively, entirely new nodes can be started that replace all the nodes in the cluster (e.g., just destroy all the old nodes).

Figure 22:
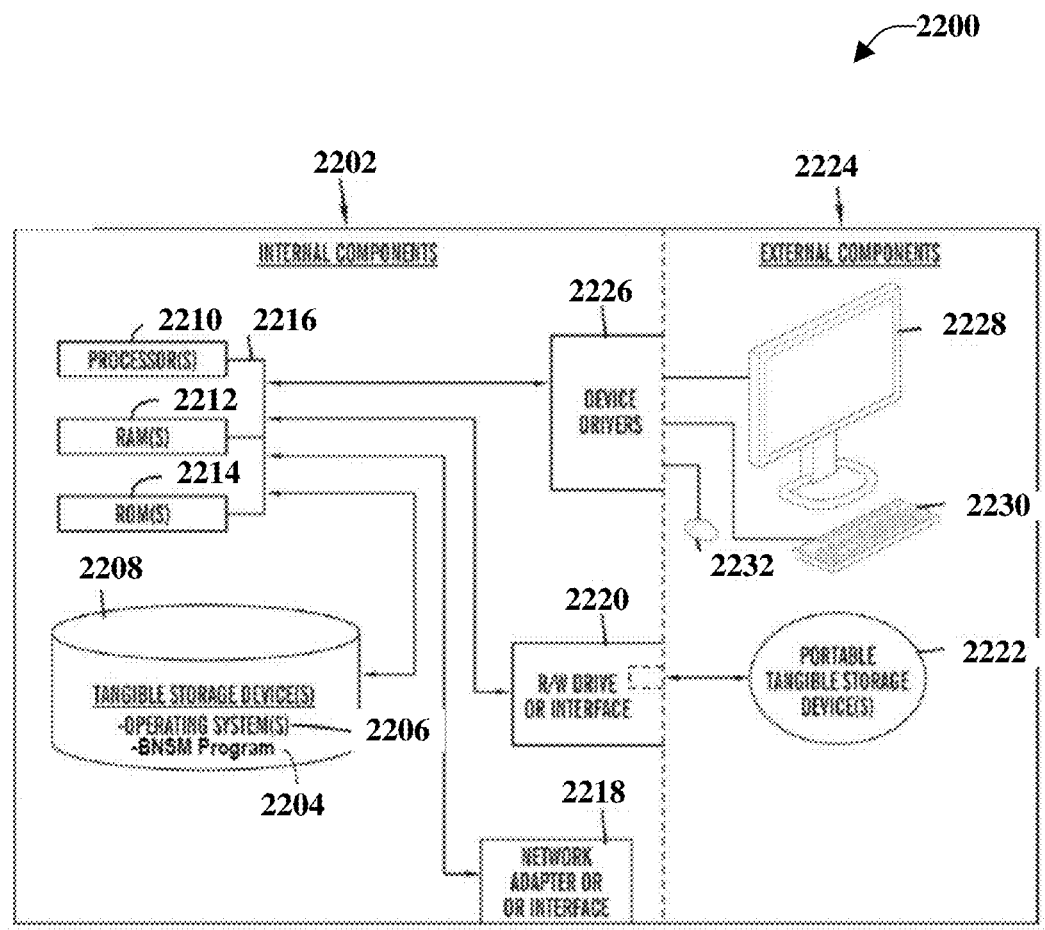
FIG. 22 illustrates an example, non-limiting blockchain network service manager program in accordance with one or more embodiments described herein.

FIG. 22 illustrates an example, non-limiting blockchain network service manager program 2200 in accordance with one or more embodiments described herein. Internal component 2202 can include a blockchain network service manager (BNSM) program 2204 and one or more operating system 2206, which can be included, at least partially in one or more tangible storage devices 2208. The internal components can also comprise one or more processors 2210, one or more Random Access Memories (RAMs) 2212, and one or more Read Only Memories (ROMs) 2214, which can be operatively coupled via a bus 2216. Further, a network adapter or interface 2218, can be operatively coupled to the bus 2216. A read/write drive or interface 2220 can be operatively coupled to the bus 2216 and to one or more portable tangible storage devices 2222, which can be included in a set of external components 2224. Further, one or more device drivers 2226 can be connected to the bus 2216 and can interface with one or more components of the set of external components 2224. For example, the one or more device drivers 2226 can interface with a computing device 2228 and with one or more input devices, illustrated as a keyboard 2230 and a mouse 2232.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts are required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 23:
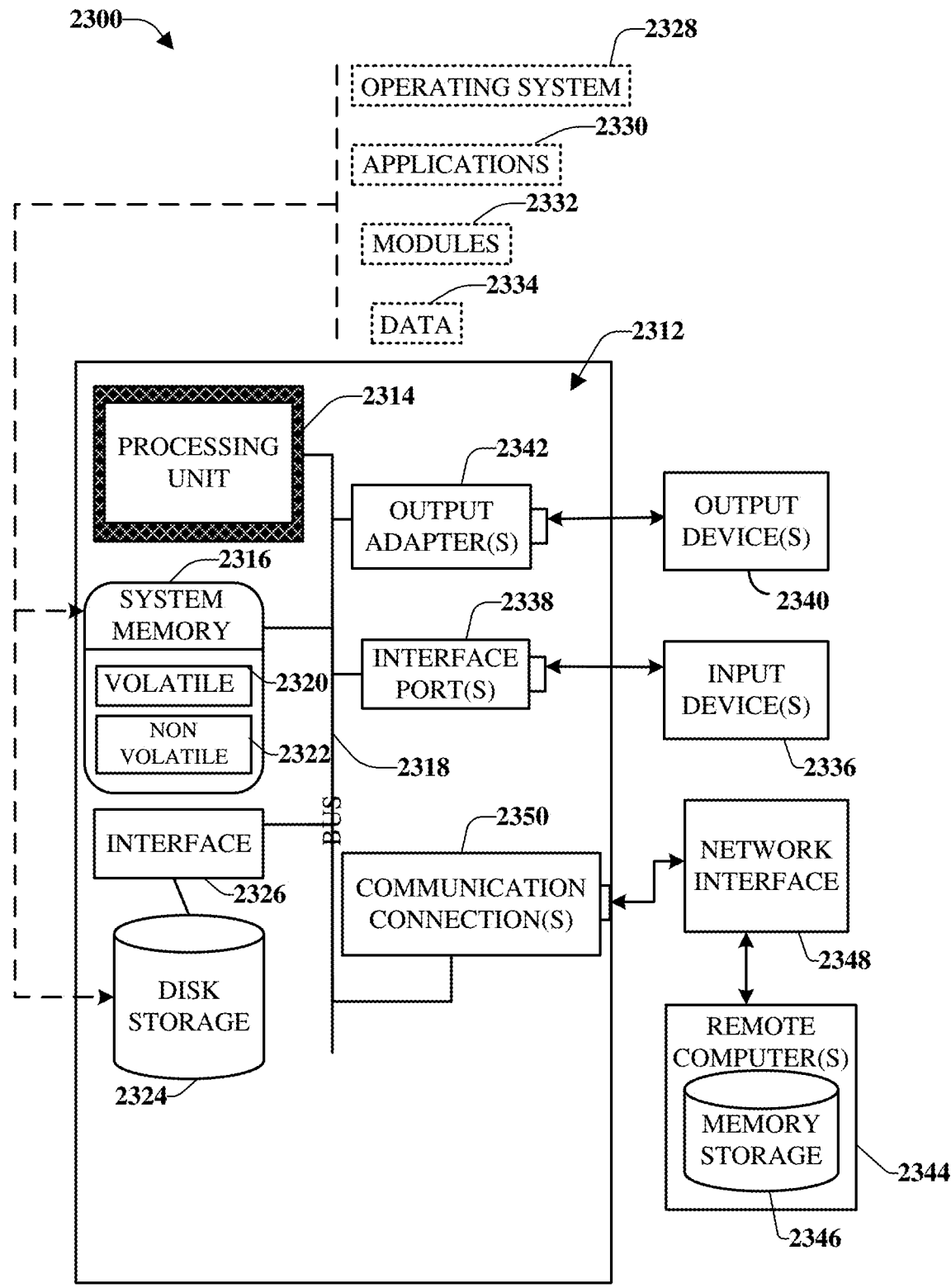
FIG. 23 illustrates a block diagram of an example, non-limiting operating environment in which one or more embodiments described herein can be facilitated.

In order to provide a context for the various aspects of the disclosed subject matter, FIG. 23 as well as the following discussion are intended to provide a general description of a suitable environment in which the various aspects of the disclosed subject matter can be implemented. FIG. 23 illustrates a block diagram of an example, non-limiting operating environment in which one or more embodiments described herein can be facilitated. Repetitive description of like elements employed in other embodiments described herein is omitted for sake of brevity. With reference to FIG. 23, a suitable operating environment 2300 for implementing various aspects of this disclosure can also include a computer 2312. The computer 2312 can also include a processing unit 2314, a system memory 2316, and a system bus 2318. The system bus 2318 couples system components including, but not limited to, the system memory 2316 to the processing unit 2314. The processing unit 2314 can be any of various available processors. Dual microprocessors and other multiprocessor architectures also can be employed as the processing unit 2314. The system bus 2318 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 2316 can also include volatile memory 2320 and nonvolatile memory 2322. The basic input/output system (BIOS), containing the basic routines to transfer information between elements within the computer 2312, such as during start-up, is stored in nonvolatile memory 2322. By way of illustration, and not limitation, nonvolatile memory 2322 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 2320 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 2312 can also include removable/non-removable, volatile/non-volatile computer storage media. FIG. 23 illustrates, for example, a disk storage 2324. Disk storage 2324 can also include, but is not limited to, devices like a magnetic disk drive, floppy disk drive, tape drive, Jaz drive, Zip drive, LS-100 drive, flash memory card, or memory stick. The disk storage 2324 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 2324 to the system bus 2318, a removable or non-removable interface is typically used, such as interface 2326. FIG. 23 also depicts software that acts as an intermediary between users and the basic computer resources described in the suitable operating environment 2300. Such software can also include, for example, an operating system 2328. Operating system 2328, which can be stored on disk storage 2324, acts to control and allocate resources of the computer 2312. System applications 2330 take advantage of the management of resources by operating system 2328 through program modules 2332 and program data 2334, e.g., stored either in system memory 2316 or on disk storage 2324. It is to be appreciated that this disclosure can be implemented with various operating systems or combinations of operating systems. A user enters commands or information into the computer 2312 through input device(s) 2336. Input devices 2336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2314 through the system bus 2318 via interface port(s) 2338. Interface port(s) 2338 include, for example, a serial port, a parallel port, a game port, and a universal serial bus (USB). Output device(s) 2340 use some of the same type of ports as input device(s) 2336. Thus, for example, a USB port can be used to provide input to computer 2312, and to output information from computer 2312 to an output device 2340. Output adapter 2342 is provided to illustrate that there are some output devices 2340 like monitors, speakers, and printers, among other output devices 2340, which require special adapters. The output adapters 2342 include, by way of illustration and not limitation, video and sound cards that provide a method of connection between the output device 2340 and the system bus 2318. It should be noted that other devices and/or systems of devices provide both input and output capabilities such as remote computer(s) 2344.

Computer 2312 can operate in a networked environment using logical connections to one or more remote computers, such as remote computer(s) 2344. The remote computer(s) 2344 can be a computer, a server, a router, a network PC, a workstation, a microprocessor based appliance, a peer device or other common network node and the like, and typically can also include many or all of the elements described relative to computer 2312. For purposes of brevity, only a memory storage device 2346 is illustrated with remote computer(s) 2344. Remote computer(s) 2344 is logically connected to computer 2312 through a network interface 2348 and then physically connected via communication connection 2350. Network interface 2348 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 2350 refers to the hardware/software employed to connect the network interface 2348 to the system bus 2318. While communication connection 2350 is shown for illustrative clarity inside computer 2312, it can also be external to computer 2312. The hardware/software for connection to the network interface 2348 can also include, for exemplary purposes only, internal and external technologies such as, modems including regular telephone grade modems, cable modems and DSL modems, ISDN adapters, and Ethernet cards.

The present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create method for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. The characteristics are as follows: on-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a high level of abstraction (e.g., country, state, or data center). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail) The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of selected networking components (e.g., host firewalls).

Deployment Models are as follows: Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 24:
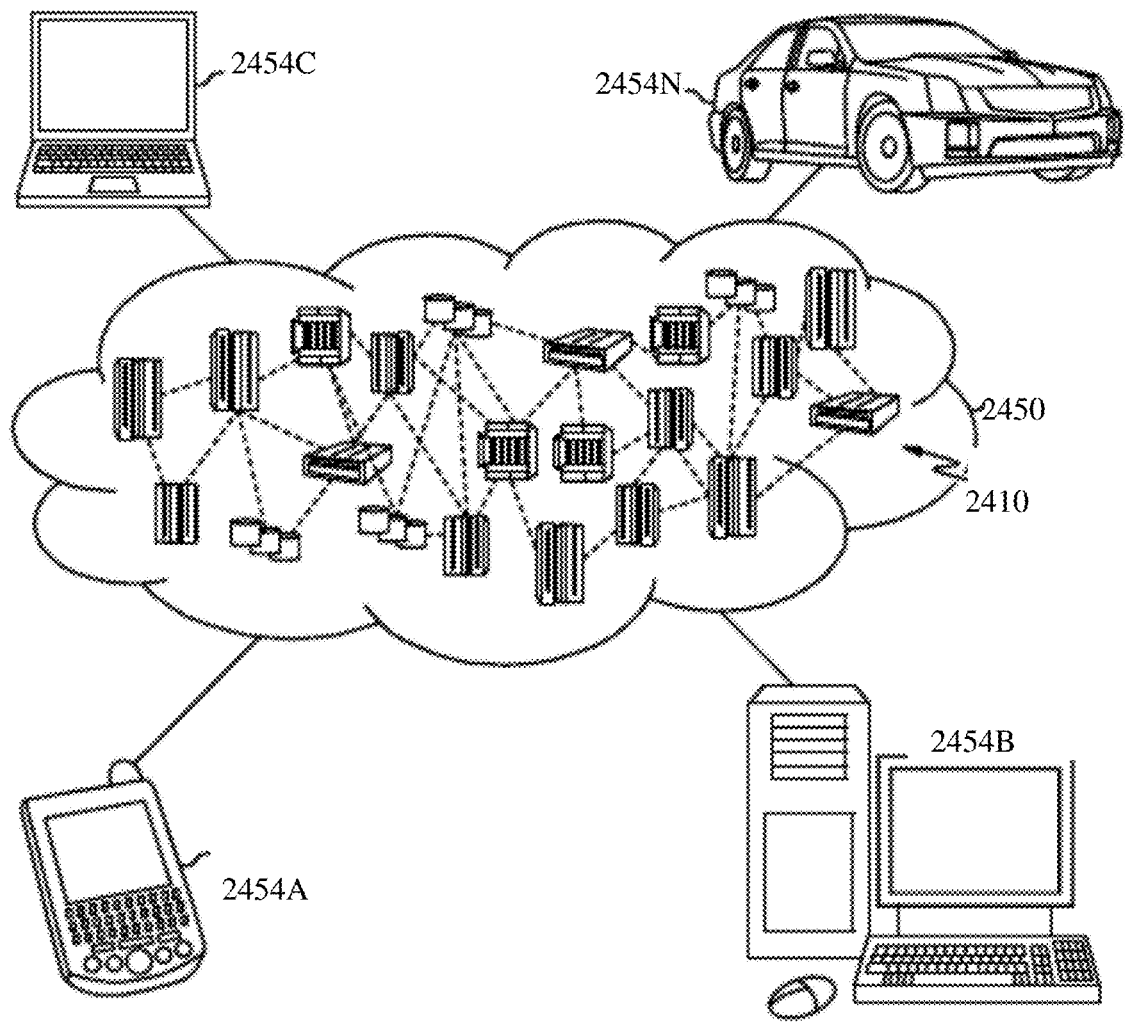
FIG. 24 depicts a cloud computing environment in accordance with one or more embodiments described herein.

Referring now to FIG. 24, illustrative cloud computing environment 2450 is depicted. As shown, cloud computing environment 2450 includes one or more cloud computing nodes 2410 with which local computing devices used by cloud consumers, such as, for example, personal digital assistant (PDA) or cellular telephone 2454A, desktop computer 2454B, laptop computer 2454C, and/or automobile computer system 2454N may communicate. Nodes 2410 may communicate with one another. They may be grouped (not shown) physically or virtually, in one or more networks, such as Private, Community, Public, or Hybrid clouds as described hereinabove, or a combination thereof. This allows cloud computing environment 2450 to offer infrastructure, platforms and/or software as services for which a cloud consumer does not need to maintain resources on a local computing device. It is understood that the types of computing devices 2454A-N shown in FIG. 24 are intended to be illustrative only and that computing nodes 2410 and cloud computing environment 2450 can communicate with any type of computerized device over any type of network and/or network addressable connection (e.g., using a web browser).

Figure 25:
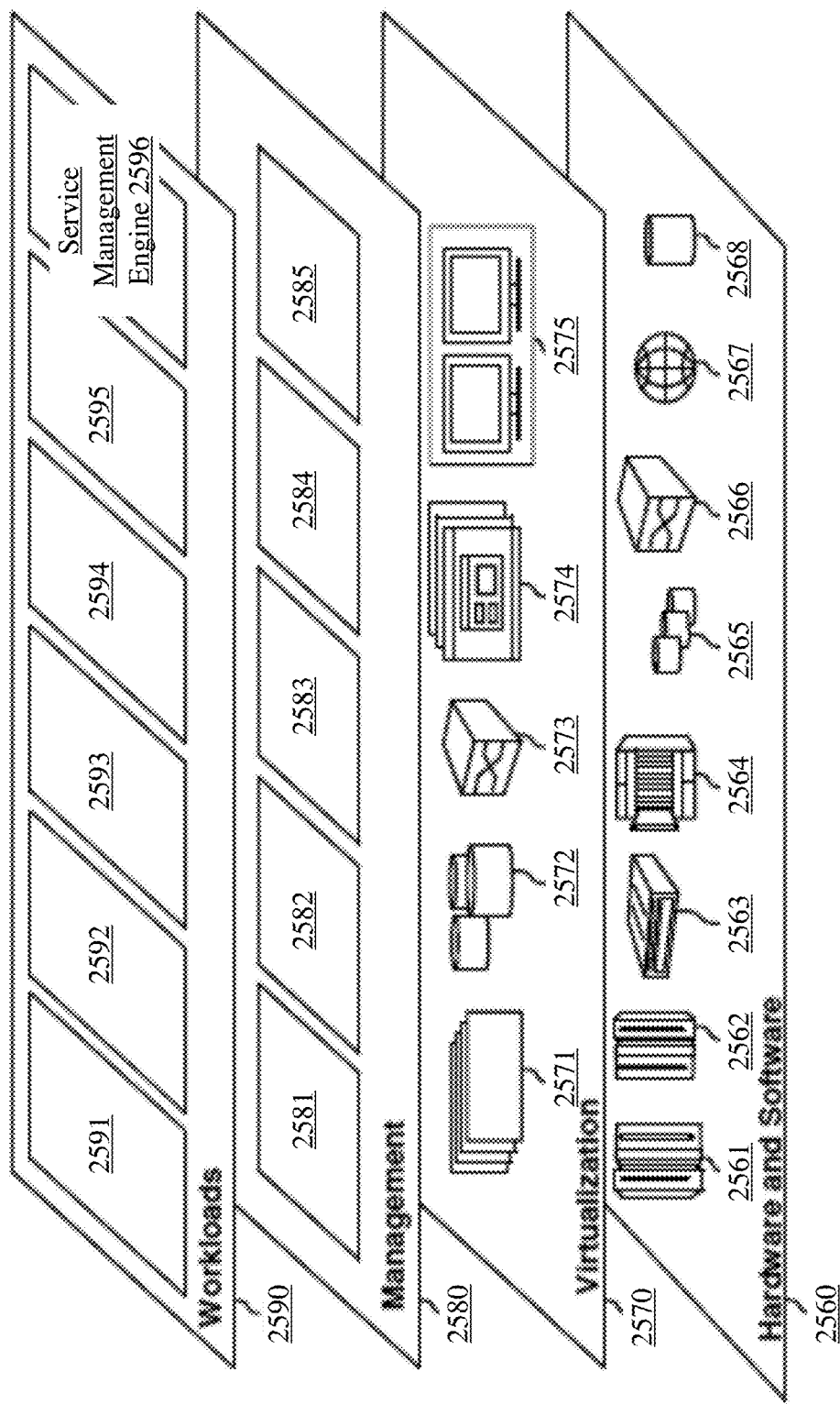
FIG. 25 depicts abstraction model layers in accordance with one or more embodiments described herein.

Referring now to FIG. 25, a set of functional abstraction layers provided by cloud computing environment 2450 (FIG. 24) is shown. It should be understood in advance that the components, layers, and functions shown in FIG. 25 are intended to be illustrative only and embodiments of the invention are not limited thereto. As depicted, the following layers and corresponding functions are provided: Hardware and software layer 2560 includes hardware and software components. Examples of hardware components include: mainframes 2561; RISC (Reduced Instruction Set Computer) architecture based servers 2562; servers 2563; blade servers 2564; storage devices 2565; and networks and networking components 2566. In some embodiments, software components include network application server software 2567 and database software 2568.

Virtualization layer 2570 provides an abstraction layer from which the following examples of virtual entities may be provided: virtual servers 2571; virtual storage 2572; virtual networks 2573, including virtual private networks; virtual applications and operating systems 2574; and virtual clients 2575.

In one example, management layer 2580 may provide the functions described below. Resource provisioning 2581 provides dynamic procurement of computing resources and other resources that are utilized to perform tasks within the cloud computing environment. Metering and Pricing 2582 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2583 provides access to the cloud computing environment for consumers and system administrators. Service level management 2584 provides cloud computing resource allocation and management such that required service levels are met. Service Level Agreement (SLA) planning and fulfillment 2585 provide pre-arrangement for, the procurement of, cloud computing resources for which a future requirement is anticipated in accordance with an SLA.

Workloads layer 2590 provides examples of functionality for which the cloud computing environment may be utilized. Examples of workloads and functions which may be provided from this layer include: mapping and navigation 2591; software development and lifecycle management 2592; virtual classroom education delivery 2593; data analytics processing 2594; transaction processing 2595; and service management engine 2596.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other method to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability;

multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   assigning, by a system operatively coupled to a processor and within a blockchain network, a first group of nodes of a first node type to a first set of operation slots and a second group of nodes of a second node type, different than the first node type, to a second set of operation slots;
   aggregating, by the system, the second group of nodes assigned to the second set of operation slots with the first group of nodes within the first set of operation slots, wherein one or more of the first set of operation slots comprise a plurality of assigned nodes corresponding to both the first group of nodes and the second group of nodes; and
   concurrently executing, by the system, a service management operation on the first group of nodes and the second group of nodes aggregated within the first set of operation slots, and a transaction of a block of a blockchain using the first group of nodes and the second group of nodes of a block of a blockchain, wherein a consensus algorithm is satisfied with respect to the first group of nodes and the second group of nodes during the executing the service management operation and the transaction.

2. The computer-implemented method of claim 1, wherein the assigning the first group of nodes is performed independent of the assigning the second group of nodes.

3. The computer-implemented method of claim 1, wherein, within the blockchain network, the first group of nodes are peer nodes and the second group of nodes are orderer nodes.

4. The computer-implemented method of claim 1, wherein the first node type is a first functionality present in the blockchain network and the second node type is a second functionality present in the blockchain network, the first functionality is different from the second functionality.

5. The computer-implemented method of claim 1, further comprising:
   executing, by the system, the service management operation based on an endorsement policy associated with the first group of nodes and the consensus algorithm associated with the second group of nodes within the blockchain network.

6. The computer-implemented method of claim 5, further comprising:
   determining, by the system, a minimum number of the second group of nodes required for endorsing the transaction based on application of a digital signature to the transaction.

7. The computer-implemented method of claim 1, wherein the consensus algorithm provides, via maintaining a minimum number of the first group of nodes and the second group of nodes that are in-service, both a correct ordering and a validation for a set of transactions within each block of the blockchain.

8. The computer-implemented method of claim 1, wherein the second group of nodes are endorsing entities, and wherein the computer-implemented method further comprises:
   receiving, by the system, the transaction submitted to the blockchain network;
   determining, by the system, that two or more nodes of the second group of nodes endorsed the transaction; and
   completing, by the system, the transaction during the executing the service management operation.

9. The computer-implemented method of claim 1, wherein the aggregating the second group of nodes comprises minimizing, by the system, a number of steps performed to for one or more service maintenance updates of the first group of nodes and the second group of nodes during the executing the service management operation.

10. A system, comprising:
a memory that stores computer executable components; and
a processor that executes the computer executable components stored in the memory, wherein the computer executable components comprise:
an allocation component that assigns, within a blockchain network, a first group of nodes of a first node type to a first set of operation slots and a second group of nodes of a second node type, different than the first node type, to a second set of operation slots;
a grouping component that aggregates the second group of nodes assigned to the second set of operation slots with the first group of nodes within the first set of operation slots, wherein one or more of the first set of operation slots comprise a plurality of assigned nodes corresponding to both the first group of nodes and the second group of nodes; and
an implementation component that concurrently executes:
a service management operation on the first group of nodes and the second group of nodes aggregated within the first set of operation slots, and
a transaction of a block of a blockchain using involving the first group of nodes and the second group of nodes,
wherein a consensus algorithm is satisfied with respect to the first group of nodes and the second group of nodes during the execution of the service management operation and the transaction.

11. The system of claim 10, wherein the allocation component assigns the first group of nodes independent of an assignment of the second group of nodes.

12. The system of claim 10, wherein, within the blockchain network, the first group of nodes are peer nodes and the second group of nodes are orderer nodes.

13. The system of claim 10, wherein the first node type is a first functionality present in the blockchain network and the second node type is a second functionality present in the blockchain network, the first functionality is different from the second functionality.

14. The system of claim 10, wherein the implementation component executes the service management operation based on an endorsement policy associated with the first group of nodes and the consensus algorithm associated with the second group of nodes within the blockchain network.

15. The system of claim 14, wherein the endorsement policy determines a minimum number of the second group of nodes required for endorsing the transaction by applying a digital signature to the transaction.

16. The system of claim 10, wherein the consensus algorithm provides, via maintaining a minimum number of the first group of nodes and the second group of nodes that are in-service, both a correct ordering and a validation for a set of transactions within each block of the blockchain.

17. The system of claim 10, wherein the grouping component minimizes a number of steps performed for one or more service maintenance updates of the first group of nodes and the second group of nodes during the implementation component executing the service management operation.

18. A computer program product for facilitating service management for a blockchain infrastructure, the computer program product comprising a non-transitory computer readable medium having program instructions embodied therewith, the program instructions are executable by a processing component to cause the processing component to:
assign, by the processing component and within a blockchain network, a first group of nodes of a first node type to a first set of operation slots and a second group of nodes of a second node type, different than the first node type, to a second set of operation slots;
aggregate, by the processing component, the second group of nodes assigned to the second set of operation slots with the first group of nodes within the first set of operation slots, wherein one or more of the first set of operation slots comprises a plurality of assigned nodes corresponding to both the first group of nodes and the second group of nodes; and
concurrently execute, by the processing component, a service management operation on the first group of nodes and the second group of nodes being aggregated within the first set of operation slots, and a transaction of a block of a blockchain using the first group of nodes and the second group of nodes, and wherein a consensus algorithm is satisfied with respect to the first group of nodes and the second group of nodes during the executing the service management operation and the transaction.

19. The computer program product of claim 18, wherein the assigning the first group of nodes is performed independent of the assigning the second group of nodes.

20. The computer program product of claim 18, wherein, within the blockchain network, the first group of nodes are peer nodes and the second group of nodes are orderer nodes.

* * * * *